US012762509B1

(12) United States Patent
Kumar et al.

(10) Patent No.: US 12,762,509 B1
(45) Date of Patent: Oct. 13, 2026

(54) STRATEGIC MACRO SPACE RECOMMENDATION

(71) Applicant: Blue Yonder Group, Inc., Scottsdale, AZ (US)

(72) Inventors: Santosh Kumar, Jharkhand (IN); Bharani Sarvepalli, Hyderabad (IN); Mayank Tiwari, Telangana (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 250 days.

(21) Appl. No.: 17/728,815

(22) Filed: Apr. 25, 2022

Related U.S. Application Data

(60) Provisional application No. 63/184,488, filed on May 5, 2021.

(51) Int. Cl.

*G06Q 10/087* (2023.01)
*G06N 3/126* (2023.01)
*G06Q 30/0202* (2023.01)
*G06Q 30/0601* (2023.01)

(52) U.S. Cl.

CPC ........... *G06Q 10/087* (2013.01); *G06N 3/126* (2013.01); *G06Q 30/0202* (2013.01); *G06Q 30/0641* (2013.01)

(58) Field of Classification Search

CPC ............. G06Q 10/087; G06Q 30/0202; G06Q 30/0641

See application file for complete search history.

(56) References Cited

U.S. PATENT DOCUMENTS

| | | | | |
|---|---|---|---|---|
| 2005/0256759 A1* | 11/2005 | Acharya | ................ | G06Q 30/02 705/7.31 |
| 2019/0147463 A1* | 5/2019 | Karmakar | .............. | G06N 20/00 705/7.31 |
| 2020/0042937 A1* | 2/2020 | Karmakar | ............ | G06Q 10/067 |
| 2022/0122157 A1* | 4/2022 | Ross | ...................... | G06V 20/20 |

OTHER PUBLICATIONS

"Quant Intelligent Retail Management", Apr. 2021, https://web.archive.org/web/20210421070116/https://www.quantretail.com/download-quant-resources (Year: 2021).*

Gupta, "ML I Linear Regression", Sep. 2018, https://web.archive.org/web/20220223140138/https://www.geeksforgeeks.org/ml-linear-regression/, (Year: 2018).*

(Continued)

*Primary Examiner* — Allen C Chein

(74) *Attorney, Agent, or Firm* — Spencer Fane LLP; Steven J. Laureanti

(57) ABSTRACT

Embodiments of the following disclosure provide a system and method for analyzing a retail space allocation including analyzing a space elasticity for a retail entity having a product display area, the product display area having products and product facings arranged in a first display configuration, generating a space allocation recommendation based on the analyzed space elasticity, generating a placement recommendation based on the generated space allocation recommendation, and rearranges the products and product facings into a second display configuration, based on the generated space allocation recommendation and the generated placement recommendation.

20 Claims, 14 Drawing Sheets

(56) References Cited

OTHER PUBLICATIONS

Fabio Pinto et al., "Space Allocation in the Retail Industry: A Decision Support System Integrating Evolutionary Algorithms and Regression Models," INESC TEC/Faculdade de Engenharia, Universidade do Porto, Porto, Portugal.
Pierre Desmet et al., "Estimation of product category sales responsiveness to allocated shelf space," International Journal of Research in Marketing vol. 15, pp. 443-457 (1998).
Keith Cox, "The Responsiveness of Food Sales to Shelf Space Changes in Supermarkets," Journal of Marketing Research vol. 1, issue 2, pp. 63-67 (May 1, 1964).
Teresa Bianchi-Aguiar et al., "Using Analytics to Enhance a Food Retailer's Shelf-Space Management," Interfaces, vol. 46, Issue 5, pp. 424-443 (2016).
Shilpa Rao et al., "Macro Space Planning to Get More Out of the Box," TCS White Papers, Tata Consultancy Services Ltd (2016).

* cited by examiner

600

900

910

920A

| FIXTURE NAME | FIXTURE SIZE IN Sqft | NO. OF BAYS |
|---|---|---|
| A | 288 | 12 |
| B | 360 | 15 |
| C | 168 | 7 |
| D | 480 | 20 |
| E | 648 | 27 |
| **TOTAL** | **1944** | **81** |

920B

| CATEGORIES | OPTIMAL AREAS | NO. OF BAYS REQUIRED |
|---|---|---|
| BEERS AND CIDERS | 288 | 12 |
| HEALTH AND BEAUTY | 600 | 25 |
| YOGURTS AND DESSERTS | 216 | 9 |
| AMB CUISINE | 432 | 18 |
| TRAINING AMBIENT SWEET | 144 | 6 |
| COMB SWEET GROC | 264 | 11 |

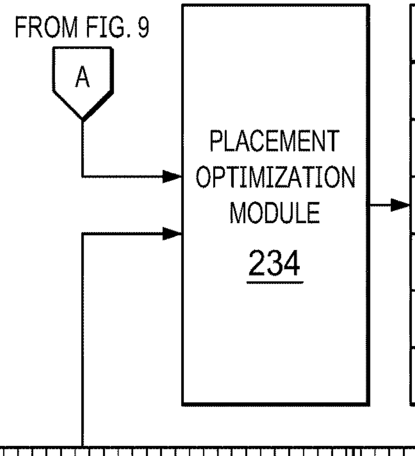

930

| CATEGORIES | ALLOCATED FIXTURE |
|---|---|
| BEERS AND CIDERS | AISLE 1 - B1 TO B12 |
| HEALTH AND BEAUTY | AISLE 1 AND 2 - B22 TO B46 |
| YOGURTS AND DESSERTS | AISLE 1 - B13 TO B21 |
| AMB CUISINE | AISLE 3 - B58 TO B75 |
| TRAINING AMBIENT SWEET | AISLE 3 - B76 TO B81 |
| COMB SWEET GROC | AISLE 2 AND 3 - B47 TO B57 |

920C

| | CATEGORY GROUPING | ADJACENCIES | | SPLITTING | OVERLAP |
|---|---|---|---|---|---|
| | DEPARTMENT | NEGATIVE ADJACENCIES | POSITIVE ADJACENCIES | IS SPLITTING ALLOWED? | OVERLAP REQUIRED? |
| BEERS AND CIDERS (CATEGORY 1) | Y | | YOGURT AND DESSERT | NO | NO |
| HEALTH AND BEAUTY (CATEGORY 12) | Z | TRAINING AMBIENT SWEET | | YES | YES |
| YOGURTS AND DESSERTS (CATEGORY 27) | X | | AMB CUISINE | NO | NO |
| AMB CUISINE (CATEGORY 33) | Y | | | NO | NO |
| TRAINING AMBIENT SWEET (CATEGORY 52) | X | | COMBO SWEET GROC | NO | YES |
| COMB SWEET GROC (CATEGORY 81) | X | | | YES | NO |

900

FIG. 9
(CONTINUED)

FROM FIG. 10

STRATEGIC MACRO SPACE RECOMMENDATION

CROSS REFERENCE TO RELATED APPLICATIONS

The present disclosure is related to that disclosed in the U.S. Provisional Application No. 63/184,488, filed May 5, 2021, entitled "Strategic Macro Space Recommendation." U.S. Provisional Application No. 63/184,488 is assigned to the assignee of the present application. The present invention hereby claims priority under 35 U.S.C. § 119(e) to U.S. Provisional Application No. 63/184,488.

TECHNICAL FIELD

The present disclosure relates generally to supply chain entity retail space utilization and to generating space recommendations and placement recommendations using machine learning and automation.

BACKGROUND

Choosing space allocations for supply chain entities, including retailers that sell a wide variety of products across potentially hundreds of categories, is a complex process that requires space allocation planners to balance a variety of potentially conflicting variables and constraints. Space allocation decisions may be broken down into levels of space breaks (including but not limited to department, category, aisle, planogram, and/or individual product classifications) and associated space allocation decisions, each presenting unique constraints, required parameters, and interrelated profitability variables. However, traditional space allocations (1) fail to balance constraints and variables across departments, categories, aisles, planograms, and individual products; (2) fail to utilize sufficiently complex and detailed quantities of variables and required parameters so as to generate accurate and profitable space allocation recommendations across different space break levels; and (3) require impractically long computing times, frequent manual intervention and supervision, and the consumption of other resources in order to generate allocation recommendations, all of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
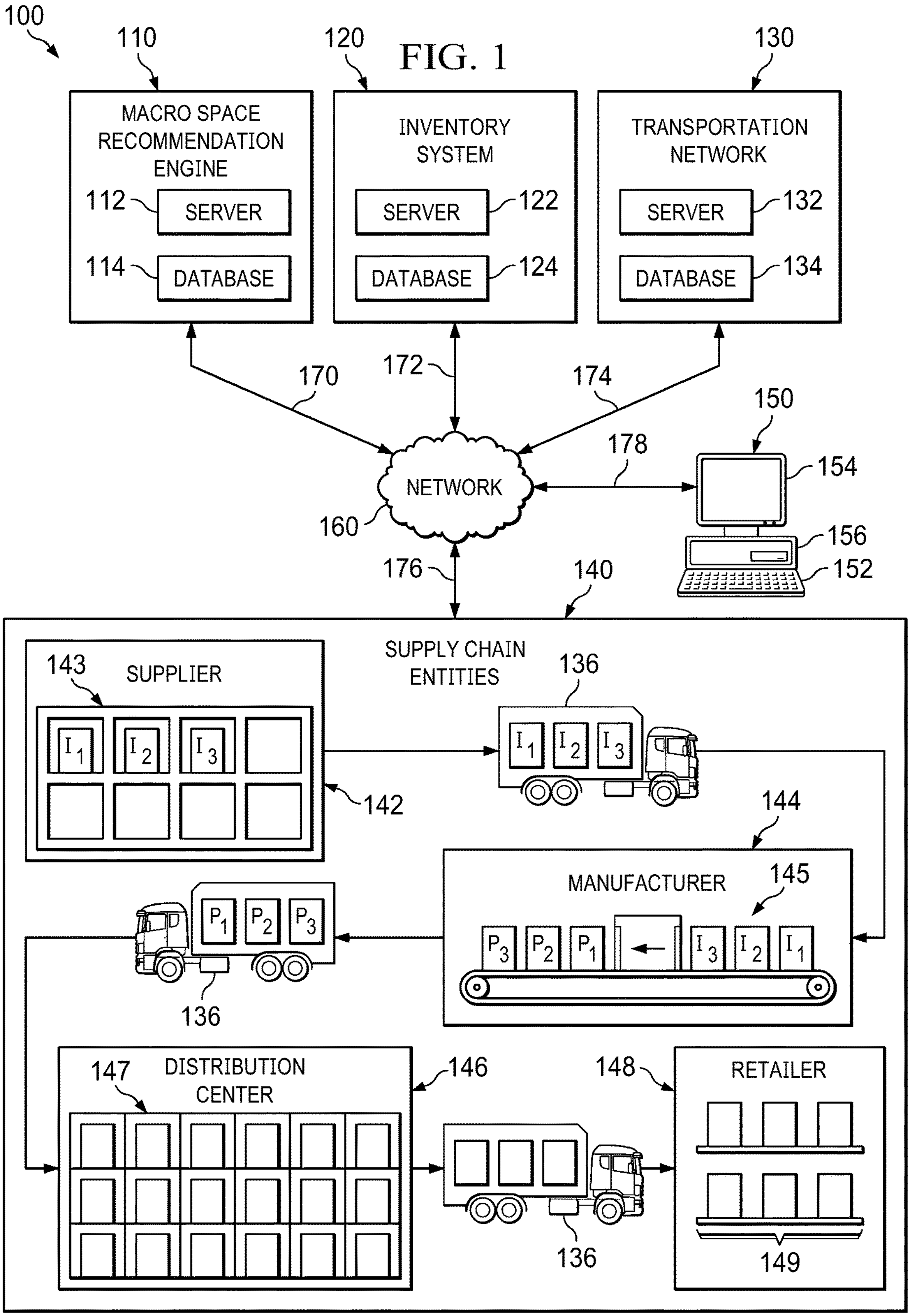
FIG. 1 illustrates an exemplary supply chain network according to an embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a macro space recommendation engine system and method to recommend one or more space allocations and placements for one or more supply chain entities across departments, categories, aisles, planograms, and individual products. Embodiments may utilize a data science engine comprising a space and location elasticity module, a space recommendation module, and a placement recommendation module, as well as one or more machine learning algorithms and/or one or more genetic algorithms, to generate and recommend space allocation plans and/or product placement plans at the level of departments, categories, aisles, planograms, and individual products. Embodiments generate one or more graphical user interface (GUI) displays illustrating the generated space allocation plans at selectable levels of granularity, and may allow planners to drill down from recommended department and category allocations to individual aisles, planograms, and individual products allocated to one or more supply chain entities within a supply chain network.

Embodiments autonomously generate space allocation plans and/or product placement plans at selectable levels of scope and plan breadth, from wide-reaching plans that specify space usage and product placement across every supply chain entity department throughout a supply chain network, down to individual product placement plans at a single supply chain entity location. Embodiments utilize machine learning and genetic algorithms to utilize a wide variety of complex interrelated variables and to generate space allocation plans and product placement plans efficiently, quickly, and without requiring frequent human interaction or oversight. Embodiments visualize the generated space allocation plans and product placement plans using intuitive and flexible GUI displays. Embodiments also calculate and display the expected increase or decrease in sales of one or more products at one or more supply chain entities if the recommended space allocation plans and/or product placement plans are implemented.

As referred to in the specification herein, the term "optimizing" in the context of optimizing a space allocation plan, a product placement plan, and/or other macro space recommendation engine outputs may refer to maximizing profitability, sales figures, or other quantifiable variables for one or more products sold at one or more supply chain entity locations in view of one or more constraints.

FIG. 1 illustrates exemplary supply chain network 100 according to a first embodiment. Supply chain network 100 comprises macro space recommendation engine 110, inventory system 120, transportation network 130, one or more supply chain entities 140, computer 150, network 160, and communication links 170-178. Although a single macro space recommendation engine 110, inventory system 120, transportation network 130, one or more supply chain entities 140, computer 150, network 160, and communication links 170-178 are shown and described, embodiments contemplate any number of macro space recommendation engines 110, inventory systems 120, transportation networks 130, supply chain entities 140, computers 150, networks 160, or communication links 170-178, according to particular needs.

In one embodiment, macro space recommendation engine 110 comprises server 112 and database 114. As explained in more detail below, macro space recommendation engine 110 comprises one or more modules to, for example, generate and recommend one or more space allocation plans and/or produce placement plans across departments, categories, aisles, planograms, and individual products, as well as one or more GUI displays illustrating the generated space allocation plans at selectable levels of granularity.

Inventory system 120 comprises server 122 and database 124. Server 122 of inventory system 120 is configured to receive and transmit inventory data, including item identifiers, pricing data, attribute data, inventory levels, and other like data about one or more items or products at one or more locations in supply chain network 100. Server 122 stores and retrieves inventory data from database 124 or from one or more locations in supply chain network 100. According to embodiments, database 124 includes current or projected inventory quantities or states, order rules, or explanatory variables. For example, database 124 may comprise the current level of inventory for each item at one or more stocking points across supply chain network 100. In addition, database 122 may comprise order rules that describe one or more rules or limits on setting an inventory policy, including, but not limited to, a minimum order quantity, a maximum order quantity, a discount, a step-size order quantity, and batch quantity rules. According to some embodiments, database 122 may comprise explanatory variables that describe the data relating to specific past, current, or future indicators and the data of promotions, seasonality, special events (such as sporting events), weather, and the like. According to some embodiments, macro space recommendation engine 110 accesses and stores inventory data in database 114, which may be used by macro space recommendation engine 110 to generate one or more space allocation recommendations and/or product placement recommendations, plans, planograms, set inventory levels at one or more stocking points, initiate manufacturing of one or more components, or the like. In addition, or as an alternative, the inventory data of database 114 may be updated by receiving current item quantities, mappings, or locations from inventory system 120, transportation network 130, and/or one or more supply chain entities 140.

Transportation network 130 comprises server 132 and database 134. According to embodiments, transportation network 130 directs one or more transportation vehicles 136 to ship one or more items between one or more supply chain entities 140, based, at least in part, on the recommendations, plans, planograms and/or instruction sets generated by macro space recommendation engine 110. Transportation vehicles 136 comprise, for example, any number of trucks, cars, vans, boats, airplanes, unmanned aerial vehicles (UAVs), cranes, robotic machinery, or the like. Transportation vehicles 136 may comprise radio, satellite, or other communication systems that communicates location information (such as, for example, geographic coordinates, distance from a location, global positioning satellite (GPS) information, or the like) with macro space recommendation engine 110, inventory system 120, transportation network 130, and/or one or more supply chain entities 140 to identify the location of each transportation vehicle 136 and the location of any inventory or shipment located on each transportation vehicle. The number of items shipped by transportation vehicles 136 in transportation network 130 may also be based, at least in part, on the number of items currently in stock at one or more supply chain entities 140, the number of items currently in transit in transportation network 130, a forecasted demand, a supply chain disruption, and the like.

As shown in FIG. 1, supply chain network 100 operates on one or more computers 150 that are integral to or separate from the hardware and/or software that support macro space recommendation engine 110, inventory system 120, transportation network 130, and one or more supply chain entities 140. Supply chain network 100 comprising macro space recommendation engine 110, inventory system 120, transportation network 130, and one or more supply chain entities 140 may operate on one or more computers 150 that are integral to or separate from the hardware and/or software that support macro space recommendation engine 110, inventory system 120, transportation network 130, and one or more supply chain entities 140. One or more computers 150 may include any suitable input device 152, including but not limited to a keypad, mouse, touch screen, microphone, or other device to input information. One or more computers 150 may also include any suitable output device 154, such as, for example, a computer monitor and speakers, which may display or convey information associated with the operation of supply chain network 100, including digital or analog data, visual information, or audio information. Computer 150 may include fixed or removable computer-readable storage media, including a non-transitory computer readable medium, magnetic computer disks, flash drives, CD-ROM, in-memory device or other suitable media to receive output from and provide input to the supply chain network 100.

Computer 150 may include one or more processors and associated memory to execute instructions and manipulate information according to the operation of supply chain network 100 and any of the methods described herein. One or more processors may execute an operating system program stored in memory to control the overall operation of computer 150. For example, one or more processors control the reception and transmission of signals within the system. One or more processors execute other processes and programs resident in memory, such as, for example, registration, identification or communication and moves data into or out of the memory, as required by an executing process. In addition, or as an alternative, embodiments contemplate executing the instructions on computer 150 that cause computer 150 to perform functions of the method. Further examples may also include articles of manufacture including tangible computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from macro space recommendation engine 110, inventory system 120, transportation network 130, and one or more supply chain entities 140. In addition, each of one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with macro space recommendation engine 110, inventory system 120, transportation network 130, and one or more supply chain entities 140.

These one or more users may include, for example, a "manager" or a "planner" handling generation of space allocation plans, product placement plans, planograms, and/or instruction sets, managing the inventory of items, imaging items, managing storage and shipment of items, and/or one or more related tasks within supply chain network 100. In addition, or as an alternative, these one or more users within supply chain network 100 may include, for example, one or more computers 150 programmed to autonomously handle, among other things, planogram planning, shelving resets, task management, communication and assignment of planograms and instructions, issue identification and resolution, controlling manufacturing equipment, and adjusting various levels of manufacturing and inventory levels at various stocking points and distribution centers, and/or one or more related tasks within supply chain network 100.

One or more supply chain entities 140 represent one or more supply chain networks, including one or more enterprises, such as, for example networks of one or more suppliers 142, manufacturers 144, distribution centers 146, retailers 148 (including brick and mortar and online stores), customers, and/or the like. Suppliers 142 may be any suitable entity that offers to sell or otherwise provides one or more items (i.e., materials, components, or products) to one or more manufacturers 144. Suppliers 142 may comprise automated distribution systems 143 that automatically transport products to one or more manufacturers based, at least in part, on plans, planograms, and/or instruction sets determined by the macro space recommendation engine 110 and/or one or more other factors described herein.

Manufacturers 144 may be any suitable entity that manufactures at least one product. Manufacturers 144 may use one or more items during the manufacturing process to produce any manufactured, fabricated, assembled, or otherwise processed item, material, component, good, or product. In one embodiment, a product represents an item ready to be supplied to, for example, one or more supply chain entities 140 in the supply chain network 100, such as retailers 148, an item that needs further processing, or any other item. Manufacturers 144 may, for example, produce and sell a product to suppliers 142, other manufacturers 144, distribution centers 146, retailers 148, a customer, or any other suitable person or entity. Manufacturers 144 may comprise automated robotic production machinery 145 that produce products based, at least in part, on planograms and instruction sets determined by macro space recommendation engine 110 and/or one or more other factors described herein.

Distribution centers 146 may be any suitable entity that offers to store or otherwise distribute at least one product to one or more retailers 148 and/or customers. Distribution centers 146 may, for example, receive a product from a first one or more supply chain entities 140 in the supply chain network 100 and store and transport the product for a second one or more supply chain entities 140. Distribution centers 146 may comprise automated warehousing systems 147 that automatically remove products from and place products into inventory based, at least in part, on one or more plans, planograms, and/or instruction sets generated by the macro space recommendation engine 110.

Retailers 148 may be any suitable entity that obtains one or more products to sell to one or more customers. Retailers 148 may (like the other one or more supply chain entities 140) comprise a corporate structure having a retail headquarters and one or more retail stores. Retail headquarters comprises a central planning office with oversight of one or more retail stores. Retailer stores may comprise any online or brick-and-mortar store, including stores with shelving systems. The one or more retail stores may sell products according to rules, strategies, orders, and/or guidelines developed by one or more retail headquarters. For example, retail headquarters may create plans, planograms, and/or instruction sets that determine how the store will shelve or display one or more products. Although planogram execution may be performed by a retail employee, embodiments contemplate automated configuration of shelving and retail displays. This may include, for example, automated robotic shelving machinery 149 that places products on shelves or automated shelving that automatically adjusts based, at least in part, on the planograms. The shelving systems may comprise, for example, various racks, fixtures, brackets, notches, grooves, slots, or other attachment devices for fixing shelves in various configurations. These configurations may comprise shelving with adjustable lengths, heights, and other arrangements.

Although one or more supply chain entities 140 are shown and described as separate and distinct entities, the same entity may simultaneously act as any one of the one or more supply chain entities 140. For example, one or more supply chain entities 140 acting as manufacturer 144 can produce a product, and the same one or more supply chain entities 140 can act as supplier 142 to supply an item to itself or another one or more supply chain entities 140. Although one example of supply chain network 100 is shown and described in FIG. 1, embodiments contemplate any configuration of the supply chain network 100, without departing from the scope described herein.

In one embodiment, each of macro space recommendation engine 110, inventory system 120, transportation network 130, computer 150, and supply chain entities 140 may be coupled with network 160 using communications links 170-178, which may be any wireline, wireless, or other link suitable to support data communications between macro space recommendation engine 110 and network 160 during operation of supply chain network 100. Although communication links 170-178 are shown as generally coupling macro space recommendation engine 110, inventory system 120, transportation network 130, one or more supply chain entities 140, and computer 150 to network 160, any of macro space recommendation engine 110, inventory system 120, transportation network 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling macro space recommendation engine 110, inventory system 120, transportation network 130, one or more supply chain entities 140, and computer 150. For example, data may be maintained locally to, or externally of macro space recommendation engine 110, inventory system 120, transportation network 130, one or more supply chain entities 140, and computer 150 and made available to one or more associated users of macro space recommendation engine 110, inventory system 120, transportation network 130, one or more supply chain entities 140, and computer 150 using network 160 or in any other appropriate manner. For example, data may be maintained in a cloud database at one or more locations external to macro space recommendation engine 110, inventory system 120, transportation network 130, one or more supply chain entities 140, and computer 150 and made available to one or more associated users of macro space recommendation engine 110, inventory system 120, transportation network 130, one or more supply chain entities 140, and computer 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

In accordance with the principles of embodiments described herein, macro space recommendation engine 110 may generate plans, recommendations, planograms, and/or instruction sets for the inventory of one or more supply chain entities 140 in supply chain network 100. Furthermore, macro space recommendation engine 110, inventory system 120, and/or transportation network 130 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 140, the configuration and quantity of packaging and shipping of products, and the display of products at one or more retail locations based on one or more planograms and instruction sets, generated plans and policies and/or current inventory or production levels. When the inventory of an item falls to a reorder point, macro space recommendation engine 110 may automatically adjust product mix ratios, inventory levels, production of products of manufacturing equipment, and proportional or alternative sourcing of one or more supply chain entities 140 until the inventory is resupplied to a target quantity.

For example, the methods described herein may include computer 150 receiving product data from automated machinery having at least one sensor and the product data corresponding to an item detected by the sensor of the automated machinery. The received product data may include an image of the item, an identifier, as described above, and/or other product data associated with the item (dimensions, texture, estimated weight, and any other like data). The method may further include computer 150 looking up the received product data in databases associated with macro space recommendation engine 110, inventory system 120, and/or transportation network 130 to identify the item corresponding to the product data received from the automated machinery.

Computer 150 may also receive, from the automated machinery, a current location of the identified item. Based on the identification of the item, computer 150 may also identify (or, in other embodiments, generate) a first mapping in databases 114, 124 and/or 134, where the first mapping is associated with the current location of the item. Computer 150 may also identify a second mapping in databases 114, 124 and/or 134, where the second mapping is associated with a past location of the identified item. Computer 150 may also compare the first mapping and the second mapping to determine if the current location of the identified item in the first mapping is different than the past location of the identified item in the second mapping. Computer 150 may then send instructions to the automated machinery based, as least in part, on one or more differences between the first mapping and the second mapping such as, for example, to locate an item to add to or remove from a shelf or an inventory of or shipment for one or more supply chain entities 140. In addition, or as an alternative, macro space recommendation engine 110 monitors the supply chain constraints of one or more items at one or more supply chain entities 140 and adjusts the orders and/or inventory of one or more supply chain entities 140 based on the supply chain constraints.

Figure 2:
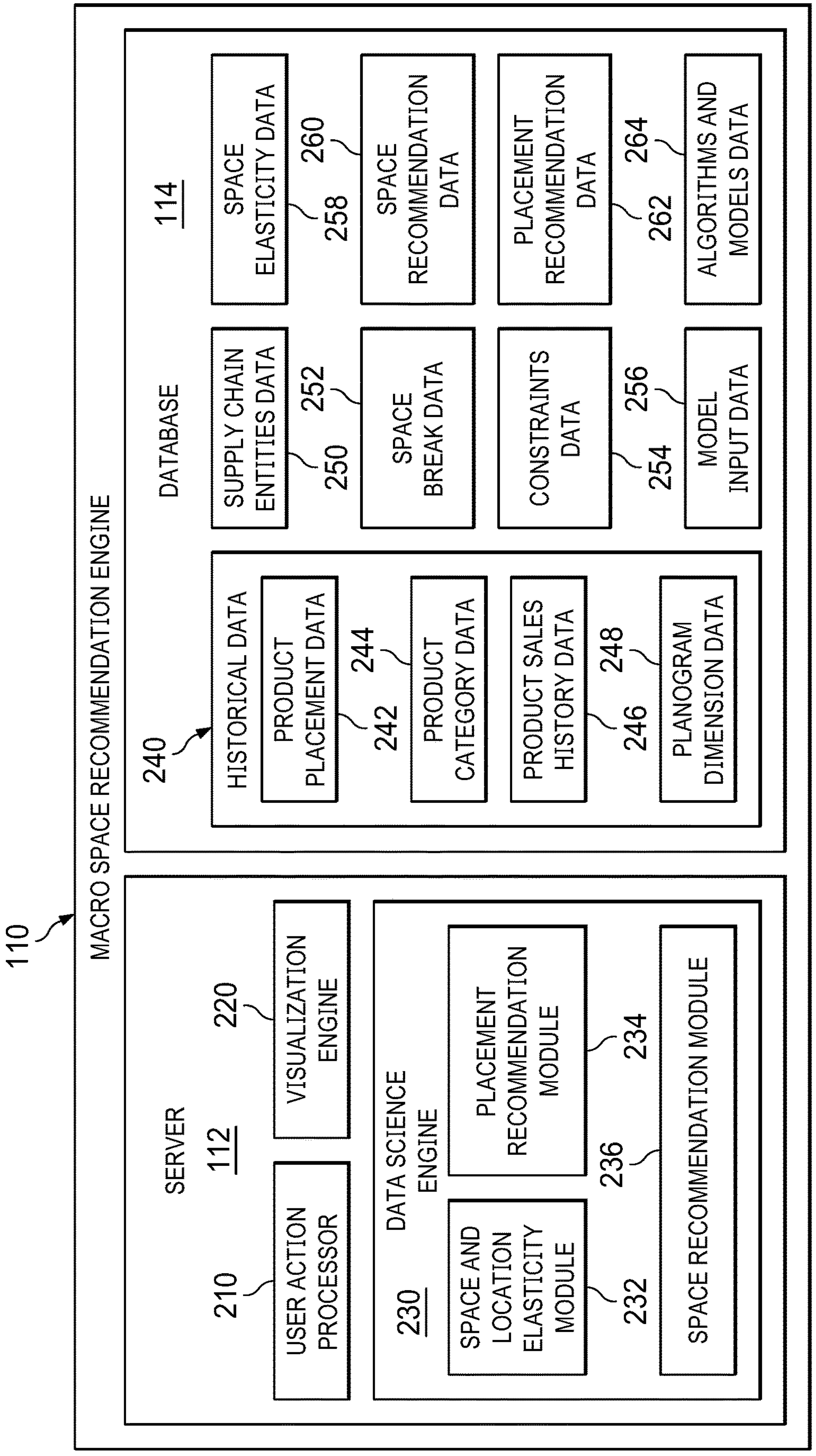
FIG. 2 illustrates the macro space recommendation engine of FIG. 1 in greater detail, according to an embodiment.

FIG. 2 illustrates macro space recommendation engine 110 of FIG. 1 in greater detail, in accordance with an embodiment. Macro space recommendation engine 110 may comprise one or more computers at one or more locations including associated input devices, output devices, monitors, non-transitory computer-readable storage media, processors, memory, or other components for receiving, processing, storing, and communicating information according to the operation of supply chain network 100. Additionally, macro space recommendation engine 110 may comprise server 112 and database 114. Although macro space recommendation engine 110 is illustrated as comprising a single server 112 and a single database 114, embodiments contemplate any suitable number of computers, servers, or databases internal to or externally coupled with macro space recommendation engine 110. According to some embodiments, macro space recommendation engine 110 may be located internal to one or more retailers 148 of one or more supply chain entities 140. In other embodiments, macro space recommendation engine 110 may be located external to one or more retailers 148 of one or more supply chain entities 140 and may be located in for example, a corporate headquarters of the one or more retailers 148, according to particular needs.

Server 112 of the macro space recommendation engine 110 may comprise user action processor 210, visualization engine 220, and data science engine 230 comprising, in an embodiment, space and location elasticity module 232, space recommendation module 236, and placement recommendation module 234. Although server 112 is shown and described as comprising a single user action processor 210, visualization engine 220, and data science engine 230 comprising a single space and location elasticity module 232, space recommendation module 236, and placement recommendation module 234, embodiments contemplate any suitable number or combination of these or other processors, engines, or modules located at one or more locations, local to, or remote from macro space recommendation engine 110, such as on multiple servers or computers at any location in supply chain network 100.

As described in greater detail below, user action processor 210 receives and processes a user input, such as, for example, input received by input device 152 of one or more computers 150. One or more computers 150 may transmit input to the macro space recommendation engine 110 using one or more communication links 170-178. User action processor 210 may register the input from one or more computers 150 and transmit the input to visualization engine 220 and/or data science engine 230, as described in greater detail below.

Visualization engine 220 may generate one or more graphical user interface (GUI) displays. According to embodiments, visualization engine 220 may access database 114 and data stored therein, including but not limited to historical data 240, product placement data 242, product category data 244, product sales history data 246, planogram dimension data 248, supply chain entities data 250, space break data 252, constraints data 254, model input data 256, space elasticity data 258, space recommendation data 260, placement recommendation data 262, and/or algorithms and models data 264, and may generate one or more GUI displays visualizing and/or displaying the database data. The one or more GUI displays may convey information, including one or more recommended space allocation plans and/or product placement plans. In an embodiment, visualization engine 220 may process input transmitted by user action processor 210, and, in response to the input, may generate one or more subsequent GUI displays that allow one or more computers 150 to interact with the one or more GUI displays and to review different information displayed by visualization engine 220, as illustrated in greater detail below.

According to embodiments, data science engine 230 generates one or more space allocation plans and/or product placement plans, as described in greater detail below. Data science engine 230 may comprise, in an embodiment, space and location elasticity module 232, space recommendation module 236, and placement recommendation module 234. Space and location elasticity module 232 may capture patterns of how external factors, constraints, and other variables affect the sales of one or more products sold at one or more supply chain entities 140, and may generate space elasticity data 258 specifying maximum available area, mean available area, and/or other available area data for one or more products sold at one or more supply chain entities 140. Space recommendation module 236 may utilize generated space elasticity data 258 to recommend one or more allocations of space at one or more space break levels (including but not limited to department levels, category levels, aisle levels, planogram levels, or product levels) to maximize the profitability of one or more products or product categories sold within the space break levels, and may generate space recommendation data 260 recommending the sale of particular products, product categories, or other quantities. Placement recommendation module 234 may access the space recommendation data 260 and may utilize one or more genetic algorithms and/or other algorithms to generate placement recommendation data 262, specifying the placement of one or more products, product categories, or other quantities within the space recommended by the space recommendation data 260.

Database 114 may comprise one or more databases or other data storage arrangements at one or more locations, local to, or remote from, server 112. Database comprises, for example: historical data 240, including but not limited to product placement data 242, product category data 244, product sales history data 246, and planogram dimension data 248; supply chain entities data 250; space break data 252; constraints data 254; model input data 256; space elasticity data 258; space recommendation data 260; placement recommendation data 262; and algorithms and models data 264. Although database 114 is shown and described as comprising historical data 240, product placement data 242, product category data 244, product sales history data 246, planogram dimension data 248, supply chain entities data 250, space break data 252, constraints data 254, model input data 256, space elasticity data 258, space recommendation data 260, placement recommendation data 262, and algorithms and models data 264, embodiments contemplate any suitable number or combination of these, located at one or more locations, local to, or remote from, the macro space recommendation engine 110 according to particular needs.

Historical data 240 comprises, for example, any data relating to past sales, past demand, purchase data, promotions, events, profitability, profitability trends, and/or the like of one or more departments, categories, aisles, planograms, products, and/or one or more supply chain entities 140. Historical data 240 may be stored at time intervals such as, for example, by the minute, hour, daily, weekly, monthly, quarterly, yearly, or any suitable time interval, including substantially in real time.

Product placement data 242 may comprise product identifiers, item identifiers, attribute data (including, for example, brands, dimensions, product images, three-dimensional product representations, and the like), inventory levels, and other like data about one or more products, product hierarchies, substitutable products, target service levels, and the like. Product placement data 242 may comprise (X,Y) locations of each and every product in the planogram with reference to a left-bottom corner.

Product category data 244 may comprise category data for each of the products stored in the product placement data 242. Product categories may organize products into any number of separate or overlapping categories. By way of example only and not by way of limitation, product category data 244 may comprise, for a series of drink products, alcoholic and non-alcoholic categories, beer, wine, and spirits categories, perishable and nonperishable categories, and/or any other categories applicable to the products. Although particular categories are described, embodiment contemplate any product categories, according to particular needs.

Product sales history data 246 comprises data relating to the sales effects each product may have when displayed next to other products on one or more shelves. Product sales history data 246 may comprise, for example, space elasticity data 258 for a particular product and a particular retail location, and/or the increases or decreases a particular product may have on other products displayed next to the product on a retail shelf. According to embodiments, product sales history data 246 may comprise any one or more general cost or sales price components of one or more items in supply chain network 100, such as, for example, holding costs, batch costs, stockout costs, inventory costs, order costs, backorder costs, and backlog costs, and/or sale prices for one or more items. Although particular product sales history data 246 are described, embodiment contemplate any type of product sales history data 246, according to particular needs.

Planogram dimension data 248 may comprise data relating to one or more planograms. According to some embodiments, planograms comprise, among other data, three-dimensional capacity data of each shelf along with the fixture dimensions and cubic capacity of overall available space, and images of products arranged in a similar layout that the products will appear on the shelves of a retail store. According to other embodiments, planograms comprise one or more digital formats that represent products and product placement as sequences of data structures that may be more easily transmitted and modified by modules or components of one or more of macro space recommendation engine 110, one or more computers 150, and/or one or more retailers 148, businesses, or supply chain entities 140 in supply chain network 100. Planogram dimension data 248 may comprise one or more currently-active planograms that are in place at the one or more retail locations. In an embodiment, planogram dimension data 248 may include relevant key performance indicators (KPIs) and metrics by which macro space recommendation engine 110 measures the performance of one or more products and/or one or more categories that have been displayed at one or more retail locations according to one or more planograms.

Supply chain entities data 250 comprises database data regarding each supply chain entity 140 in supply chain network 100, including but not limited to entity size, location, inventory, available shelf space, shipping capacity, and/or customer history. Space break data 252 comprises data related to one or more space break levels (such as, for example, dividing products sold at supply chain entities 140 by department, category, aisle, planogram, and/or individual product information).

Constraints data 254 may comprise one or more the constraints data accessed by data science engine 230 in the process of generating one or more plans, recommendations, and/or planograms. By way of example only and not by way of limitation, constraints data 254 may comprise macro space constraint rules, such as, for example: items allocated to each shelf in the planogram should not exceed the capacity of the shelf; items with the same stock keeping unit (SKU) (similar products) should be displayed together in the planogram; and the minimum and maximum number of facings (wherein an item is displayed, for example, at the edge of a shelf with the front of its package facing outward) which can be allocated to each item should fall within the known limits of the database data. Constraints may further comprise inventory storage or spoilage problems associated with one or more products, space adjustments, and/or merchandiser wish lists for one or more products. Although particular constraint examples are described, embodiments contemplate data science engine 230 accessing and using any constraints data 254 to generate one or more space allocation plans, product placement plans, and/or planograms, according to particular needs.

Model input data 256 comprises input data, including but not limited to one or more selected supply chain entities 140 and/or one or more selected space break levels, that data science engine 230 may incorporate into one or more space allocation plans and/or product placement plans. Space elasticity data 258 may comprise one or more calculated space elasticity data 258 for one or more products, items, and/or quantities sold at one or more supply chain entities 140 as a function of space allocated to each product, item, and/or quantity at each supply chain entity 140.

Space recommendation data 260 may comprise one or more space allocation recommendations and/or space allocation plans generated by space recommendation module 236, and may also store the calculated expected rise or fall in sales of one or more products at one or more supply chain entities 140 if one or more space allocation recommendations are implemented. Placement recommendation data 262 may comprise one or more placement recommendations and/or product placement plans generated by placement recommendation module 234.

Algorithms and models data 264 may comprise one or more machine learning models, genetic algorithms, and/or other algorithms or models used by data science engine 230 to generate space allocation plans, product placement plans, and/or other data, as described in greater detail below.

Figure 3:
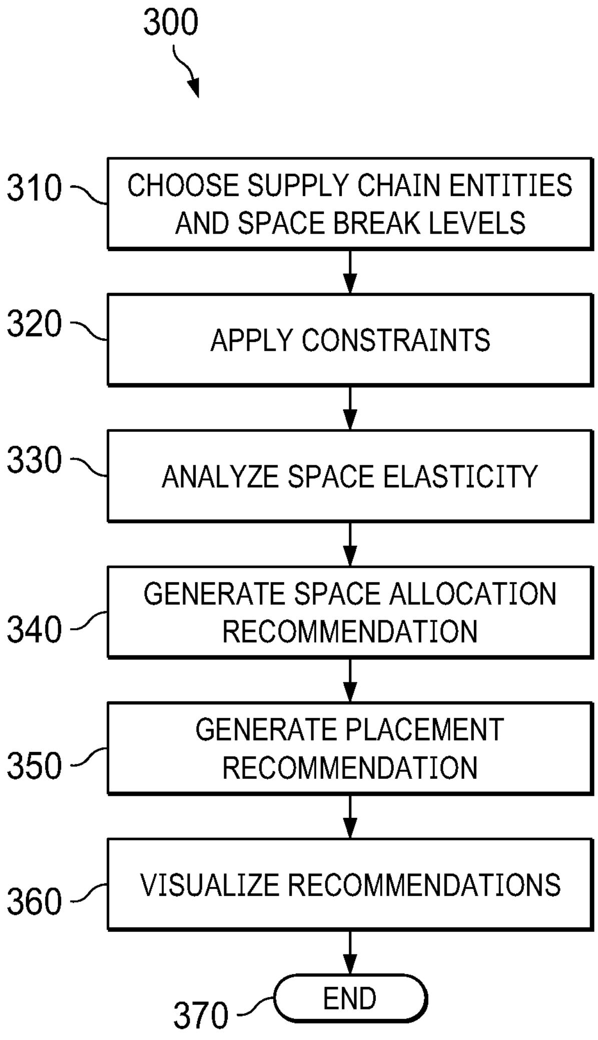
FIG. 3 illustrates an exemplary method to generate one or more space allocation plans and/or one or more product placement plans, according to an embodiment.

FIG. 3 illustrates exemplary method 300 executed by macro space recommendation engine 110 to generate one or more space allocation plans and/or one or more product placement plans, according to an embodiment. Method 300 proceeds by one or more actions 310-360, which although described in a particular order may be performed in one or more permutations, combinations, orders, or repetitions, according to particular needs.

At first action 310, macro space recommendation engine 110 chooses supply chain entities 140 and space break levels for which to carry out the other actions of method 300. User action processor 210 may receive input from one or more computers 150, such as, for example, input to a computer input device mouse, keyboard, or touchscreen, and may transmit the input to visualization engine 220. In response to the transmitted input, visualization engine 220 may generate one or more GUI displays displaying available supply chain entities 140, drawn from supply chain entities data 250, and available space break levels, drawn from space break data 252. User action processor 210 may receive input from one or more computers 150, such as, for example, input to a computer input device mouse, keyboard, or touchscreen, to select one or more supply chain entities 140 or group of supply chain entities 140, as well as one or more space break levels. Data science engine 230 may store the selected one or more supply chain entities 140 and space break levels in model input data 256.

At second action 320, data science engine 230 applies one or more constraints and macro space requirements to selected supply chain entities 140 and space break levels. Data science engine 230 accesses the selected one or more supply chain entities 140 and space break levels, as well as constraints and macro space requirements stored in constraints data 254. In an embodiment, data science engine 230 begins with a zero constraint world analysis of selected supply chain entities 140 according to the selected space break levels, and then applies the constraints to selected supply chain entities 140 and space break levels. The applied constraints may comprise, for example, inventory problems, placement constraints, space adjustments, merchandising requirements, and/or merchandiser's wish lists. Data science engine 230 stores the constraint-applied supply chain entities (henceforth, "constrained supply chain entities") in model input data 256.

At third action 330, the space and location elasticity module 232 analyzes space elasticity for the one or more constrained supply chain entities. Space and location elasticity module 232 calculates the degree to which the sale of one or more products, items, and/or other quantities at the one or more supply chain entities 140 may be affected by, and may change in relationship to, one or more space allocation plans and the space allocated to each product, item, and/or quantity at each supply chain entity 140 as specified by the one or more space allocation plans. In an embodiment, the space and location elasticity module 232 may use one or more machine learning models, and/or one or more time series forecasting models, to calculate the space elasticity and the degree to which sales of one or more products, items, and/or other quantities depends on the space allocated to each product, item, and/or quantity at each supply chain entity 140.

In an embodiment, space and location elasticity module 232 accesses the one or more constrained supply chain entities stored in model input data 256, historical data 240 and all data 242-248 stored within historical data 240, and one or more machine learning models stored in algorithms and models data 264. The one or more machine learning models may calculate the space elasticity of one or more products, items, and/or quantities sold at each constrained supply chain entity, taking into account all constraints at each supply chain entity and historical data 240. Space elasticity measures the increasing responsiveness of sales, price and volume. As more space is allocated to a product, a decline in marginal returns occurs at some point. Space elasticity is defined as the percent change in quantity, sales and profit, divided by percentage change in space. In an embodiment, the one or more machine learning models may utilize the following equation (1) to calculate the space elasticity for one or more products, items, and/or quantities sold at each constrained supply chain entity as a function of space allocated to each product, item, and/or quantity:

$$\epsilon = \frac{\Delta\text{sales/sales}}{\Delta\text{space/space}} = \frac{(Ct1 - Ct0)/Cto}{(St1 - St0)/Sto} \quad (1)$$

The one or more machine learning models may further utilize equation set (2) to calculate space elasticity.

| Transformation | Function | Elasticity | (2) |
|---|---|---|---|
| Level-level | $Y = a + bX$ | $\epsilon = b * \frac{X}{Y}$ | |
| Log-level | $\log(Y) = a + bX$ | $\epsilon = b * X$ | |
| Level-log | $Y = a + b * \log(X)$ | $\epsilon = \frac{b}{Y}$ | |
| Log-log | $\log(Y) == +b * \log(X)$ | $\epsilon = b$ | |

Having calculated the space elasticity for one or more products, items, and/or quantities sold at each constrained supply chain entity as a function of space allocated to each product, item, and/or quantity, space and location elasticity module 230 stores the calculated space elasticity in space elasticity data 258.

At fourth action 340, space recommendation module 236 generates one or more space allocation recommendations for the one or more constrained supply chain entities. Space recommendation module 236 uses the calculated space elasticity to determine space allocations that may be divided between or allocated to different products, items, and/or quantities at one or more supply chain entities 140. Space recommendation module 236 may balance one or more constraints on each supply chain entity 140 (such as, for example, only being able to assign 1,000 square feet of shelf space across all products and product combinations at a particular supply chain entity, or having to accommodate structural pillars that inconvenience large portions of shelf space at another supply chain entity) with product profitability data to generate one or more space allocation recommendations that maximize product sales and/or returns on available space at the one or more supply chain entities 140. Space recommendation module 236 may also factor one or more tie-up promotions or other promotional campaigns shared between multiple supply chain entities Space recommendation module 236 accesses one or more constrained supply chain entities stored in model input data 256, historical data 240 and all data 242-248 stored within historical data 240, and the calculated space elasticity stored in space elasticity data 258. Space recommendation module 236 calculates space allocations and generates space allocation recommendations (including but not limited to space allocation plans) that maximize the profitability of one or more products, product categories, items, and/or other quantities at each supply chain entity. In an embodiment, space recommendation module 236 calculates space allocations and generates space allocation recommendations using the following equation (3):

$$\max\left(\sum_{i=1}^{c}\left(\frac{Z_i}{S_i}\right)\right) \quad (3)$$

In equation (2), Zi represents a product category evaluation metric, and i represents each product category. $S_i$ can vary from a minimum to a maximum historical value for each product category based on recent historical data. Depending upon $S_i$, equation (3) may predict sales for a product category. In embodiments, equation (3) may be subject to the following constraints: the total of adding together $S_1$ through $S_n$ is less than or equal to total shelf area of the store, $S_i$ is greater than a square feet, $S_2$ is greater than b square feet, and so on until $S_n$ is greater than n square feet, and $S_1$ is less than p square feet, $S_2$ is less than q square feet, and so on until $S_n$ is less than r square feet, Having generated one or more space allocation recommendations (including but not limited to space allocation plans), space recommendation module 236 stores the space allocation recommendations and/or the space allocation plans in space recommendation data 260. Space recommendation module 236 may also calculate the expected rise in sales of one or more products at one or more supply chain entities 140 if the space allocation recommendations are implemented, and may store the expected rise in sales data in space recommendation data 260.

At fifth action 350, placement recommendation module 234 generates one or more placement recommendations. Placement recommendation module 234 balances the constraints of the one or more products, items, and/or quantities to determine and recommend profitable placements of products, items, and/or quantities within the spaces recommended by space recommendation module 236. For example, in an embodiment, some related products within the same category (for example, shampoo and conditioner within the health and beauty product category) should only be placed within any available space allocations if the related products can be placed near one another within the available space allocations; if there is only room within the space allocations to place one of the two health and beauty products (shampoo or conditioner), it may be more profitable to place neither product in the available space allocation and to place a separate product from a separate product category (for example, electronics and alkaline batteries) in the available space instead. Placement recommendation module 234 attempts to maximize profitable product sales by generating placement recommendations that take into account constraints, available space allocations, product inventories, past sales, and/or other relevant data and variables.

In an embodiment, placement recommendation module 234 accesses one or more constrained supply chain entities stored in model input data 256, historical data 240 and all data 242-248 stored within historical data 240, the calculated space elasticity stored in space elasticity data 258, the space recommendations and/or space allocation plans stored in space recommendation data 260, and one or more genetic algorithms stored in algorithms and models data 264. Placement recommendation module 234 uses the one or more genetic algorithms to generate placement recommendations, including but not limited to one or more product placement plans, specifying the placement of one or more products, product categories, or other quantities within the space recommended by the space recommendations and/or space allocation plans. Placement recommendation module 234 stores the placement recommendations and/or product placement plans in placement recommendation data 262 of database 114.

At sixth action 360, visualization engine 220 generates and displays one or more GUI displays to visualize the space allocation recommendations and/or the placement recommendations. In an embodiment, visualization engine 220 accesses one or more space allocation recommendations (including but not limited to space allocation plans) stored in space recommendation data 260, and/or one or more placement recommendations (including but not limited to product placement plans) stored in placement recommendation data 262. Visualization engine 220 generates and displays one or more GUI displays to visualize the space allocation recommendations and/or placement recommendations using one or more display devices. Macro space recommendation engine 110 then terminates method 300.

To illustrate the operation of macro space recommendation engine 110 executing the actions of the above-described method 300, the following example is provided. In this example, macro space recommendation engine 110 assigns space allocations to the following six product categories: beers and ciders, health and beauty, yogurts and desserts, AMB cuisine, training ambient sweets, and combined sweet groceries. Having assigned space allocations to the preceding six categories, macro space recommendation engine 110 then assigns product placement allocations within each of the six categories. Although this example provides particular examples of macro space recommendation engine 110 executing actions of the above-described method, embodiments contemplate macro space recommendation engine 110 generating space allocation recommendations and placement allocation recommendations of any configuration and across any products, product categories, and/or supply chain entities 140, according to particular needs.

In this example, at first action 310, macro space recommendation engine 110 chooses supply chain entities 140 and space break levels for which to carry out the other actions 320-360 of the example. User action processor 210 receives input from one or more computers 150, such as, in this example, input to computer input device 152 mouse and keyboard, and transmits the input to visualization engine 220. In response to the transmitted input, visualization engine 220 generates one or more GUI displays displaying available supply chain entities, drawn from supply chain entities data 250, and available space break levels, drawn from space break data 252.

Figure 4:
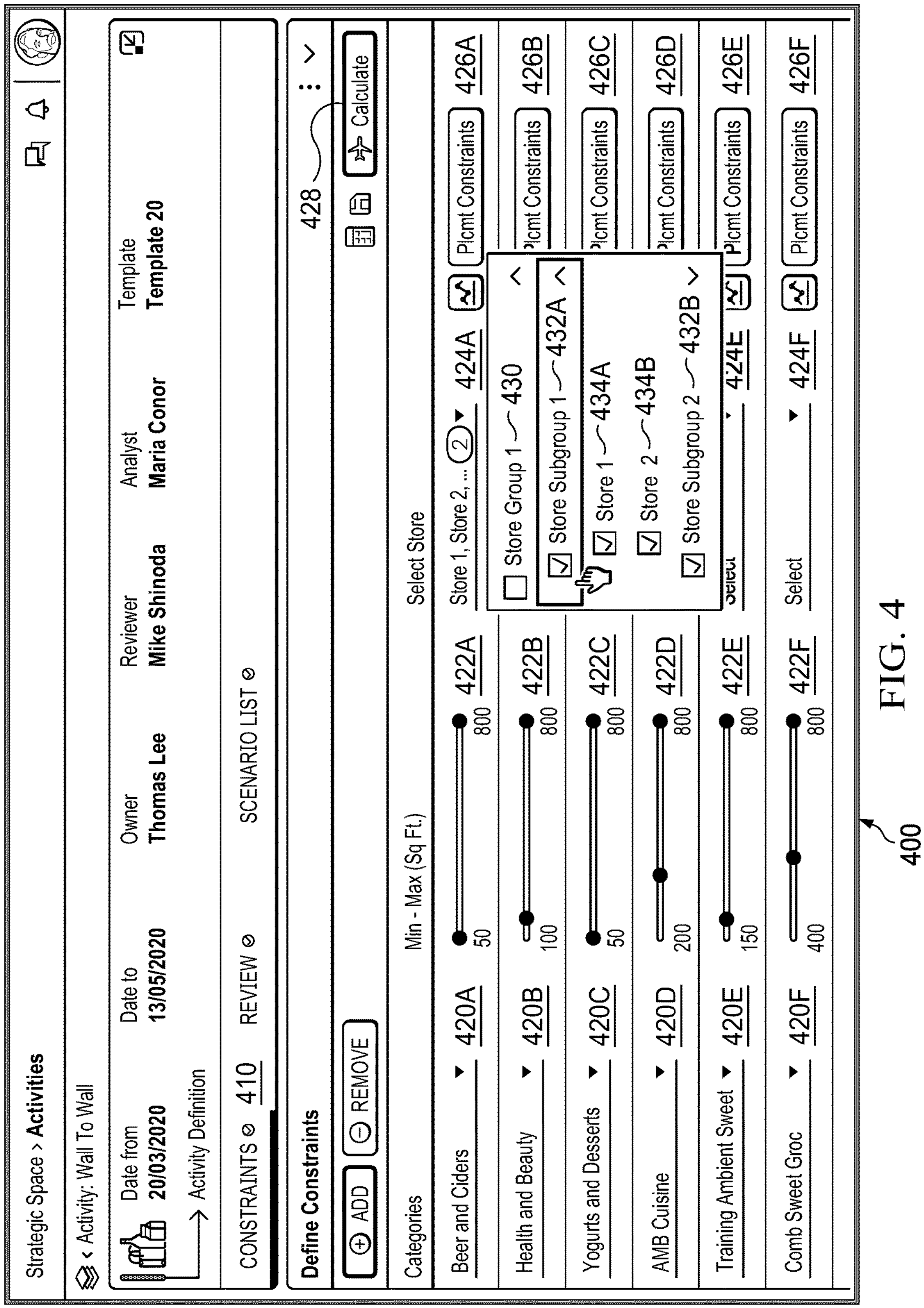
FIG. 4 illustrates a first graphical user interface display, according to an embodiment.

FIG. 4 illustrates first GUI display 400, according to an embodiment. Continuing the example, in the embodiment illustrated by FIG. 4, first GUI display 400 illustrates "Constraints" tab 410 that may permit one or more computers 150 to select, among other selectable options, one or more stores 424A-424F (indicated by the "Select Store" column of "Constraints" tab 410) and one or more space break level categories 420A-420F (indicated by the "Categories" column of "Constraints" box 410) for which to perform the actions of method 300. Although FIG. 4 illustrates first GUI display 400 in a particular configuration, embodiments contemplate the visualization engine 220 generating one or more GUI displays in any configuration and displaying any macro space recommendation engine 110 database data, according to particular needs.

Continuing the example, user action processor 210 receives input from one or more computers 150 to select, in this example, "Store Subgroup 1" 432A, which itself includes store 1 434A and store 2 434B, and "Store Subgroup 2" 432B as supply chain entities 140 (henceforth, "Selected Stores"), and "Beer and Ciders" 420A, "Health and Beauty" 420B, "Yogurts and Desserts" 420C, "AMB Cuisine" 420D, "Training Ambient Sweet" 420E, and "Comb Sweet Groc" 420F as the six space break level categories (henceforth, "Selected Categories"), for which to perform the other actions of method 300. Data science engine 230 stores the Selected Stores (432A, 434A, 434B and 432B) and Selected Categories 420A-420F in model input data 256.

Continuing the example, at second action 320, data science engine 230 applies constraints and macro space requirements to the Selected Stores (432A, 434A, 434B and 432B) and Selected Categories 420A-420F. Data science engine 230 accesses Selected Stores (432A, 434A, 434B and 432B) and Selected Categories 420A-420F, as well as constraints and macro space requirements stored in constraints data 254. Data science engine 230 begins with a zero constraint world analysis of the Selected Stores (432A, 434A, 434B and 432B) and Selected Categories 420A-420F, and then applies the constraints to the Selected Stores (432A, 434A, 434B and 432B) and Selected Categories 420A-420F.

Figure 5:
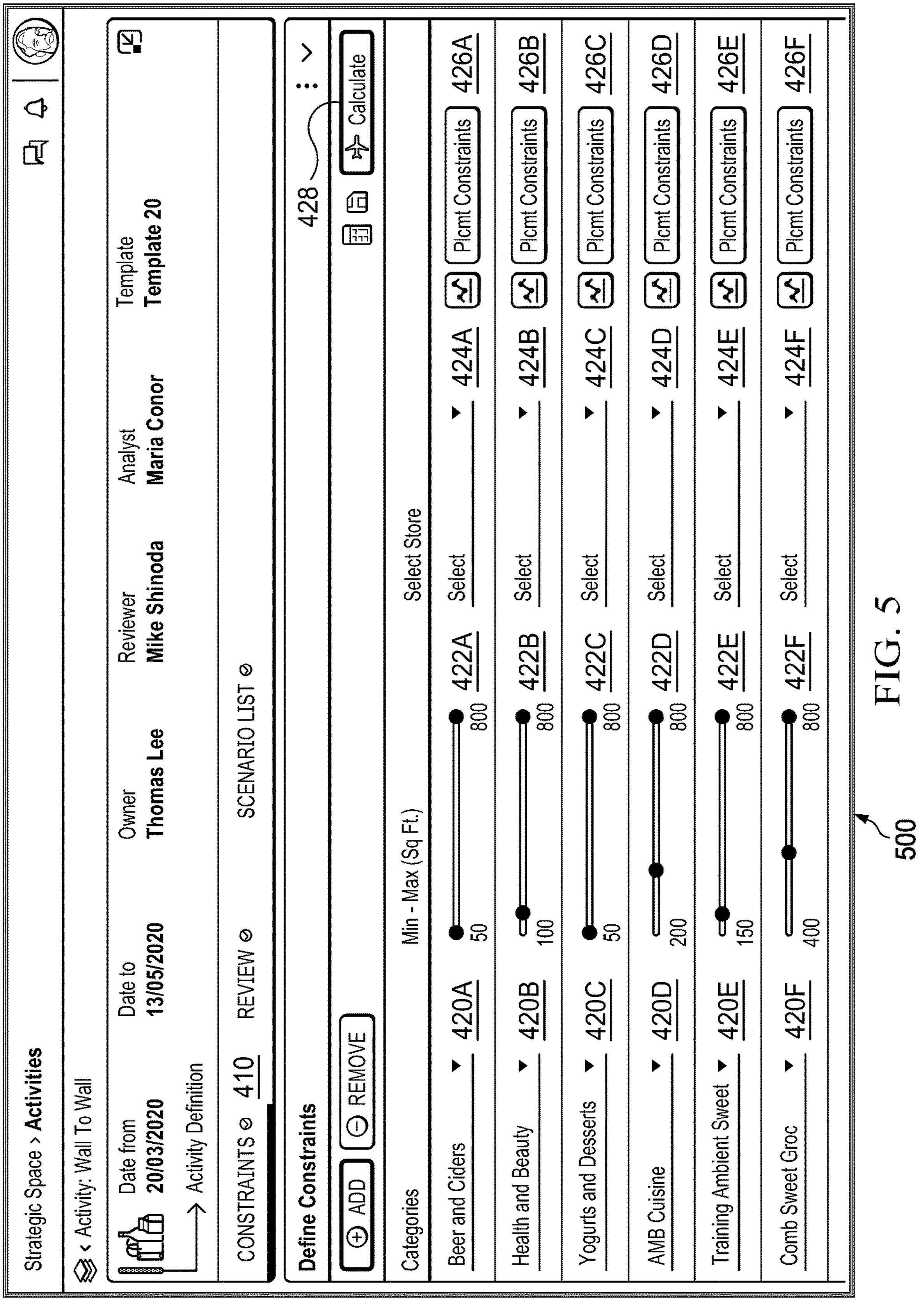
FIG. 5 illustrates a second graphical user interface display, according to an embodiment.

FIG. 5 illustrates second GUI display 500, according to an embodiment. Continuing the example, in the embodiment illustrated by FIG. 5, second GUI display 500 illustrates a "Min-Max (Sq. Ft.)" column that may permit the adjustment of the minimum and maximum square feet (accomplished by adjusting one or more slider controls 422A-422F) allocated to each of Categories 420A-420F at each of Stores 424A-424F in response to input detected by user action processor 210, as well as a "Placement Constraints" column that may permit the configuration of placement constraints 426A-426F for each of the Categories 420A-420F at each of the Selected Stores 424A-424F. Although FIG. 5 illustrates second GUI display 500 in a particular configuration, embodiments contemplate visualization engine 220 generating one or more GUI displays in any configuration and displaying any constraints, configuration options for constraints, or other macro space recommendation engine 110 database data, according to particular needs.

Continuing the example, user action processor 210 receives input from one or more computers 150 to select, in this example, "Placement Constraints" button 426A for "Beer and Ciders" category 420A. In response, visualization engine 220 generates third GUI display 600, illustrated by FIG. 6, enabling the configuration of placement constraints 426A for "Beer and Ciders" category 420A.

Figure 6:
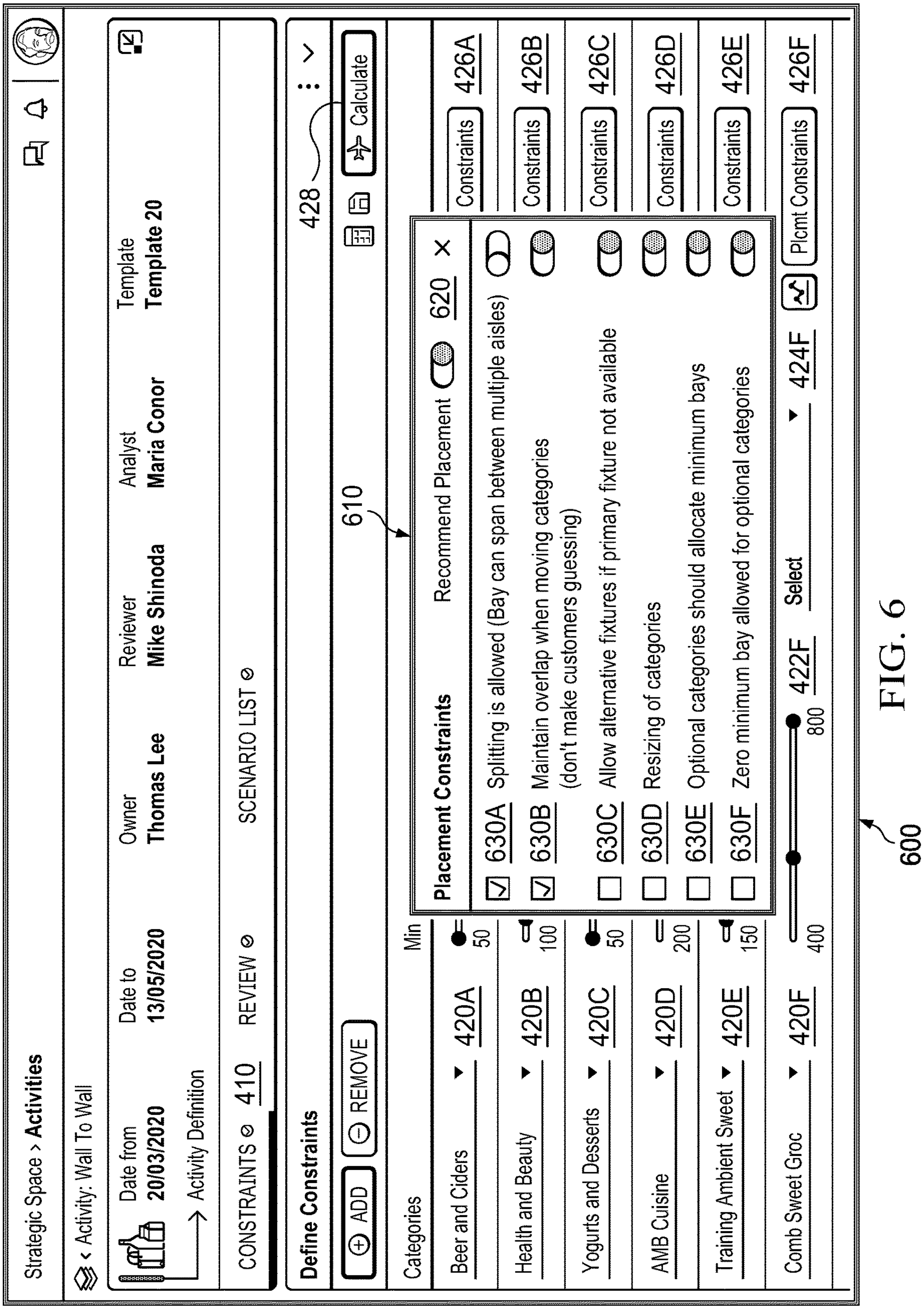
FIG. 6 illustrates a third graphical user interface display, according to an embodiment.

FIG. 6 illustrates third GUI display 600, according to an embodiment. Continuing the example, in the embodiment illustrated by FIG. 6, third GUI display 600 illustrates "Placement Constraints" pop-up box 610, illustrating selectable placement constraints 630A-630F for the "Beer and Ciders" category 420A. Although FIG. 6 illustrates third GUI display 600 in a particular configuration, embodiments contemplate visualization engine 220 generating one or more GUI displays in any configuration and displaying any constraints, configuration options for constraints, or other database 114 data, according to particular needs.

Continuing the example, "Placement Constraints" pop-up box 610 modifies constraints and activates/deactivates constraints for the placement of products within the "Beer and Ciders" category 420A at one or more of the Selected Stores 424A-424F. "Placement Constraints" pop-up box 610 includes "Recommend Placement" toggle button 620. In this example, the placement constraint options for products within "Beer and Ciders" category 420A comprise "Splitting is allowed" 630A, "Maintain overlap when moving categories" 630B, "Allow alternative fixtures if primary fixture not available" 630C, "Resizing of categories" 630D, "Optional categories should allocate minimum bays" 630E, and "Zero minimum bay allowed for optional categories" 630F. In other embodiments not illustrated by FIG. 6, placement constraint options 630A-630F may comprise any configuration of placement constraints for any space break levels, departments, categories, aisles, planograms, and/or individual products, according to particular needs. In this example, user action processor 210 receives input from one or more computers 150 to configure placement constraints 426A-426F for "Beer and Ciders" category 420A. Data science engine 230 stores the configured placement constraints 426A-426F in model input data 256. User action processor 210 receives input from one or more computers 150 to actuate "Calculate" button 428 displayed on third GUI display 600, and macro space recommendation engine 110 moves to third action 330.

Continuing the example, at third action 330, space and location elasticity module 232 accesses Selected Stores (432A, 434A, 434B and 432B) and Selected Categories 420A-420F stored in model input data 256, historical data 240 and all data stored within the historical data 240, and a space elasticity machine learning model stored in algorithms and models data 264. Space elasticity machine learning model calculates the space elasticity of Selected Categories 420A-420F products sold at Selected Stores (432A, 434A, 434B and 432B), taking into account all constraints at each store that comprises Selected Stores (432A, 434A, 434B and 432B) and historical data 240 associated with each of Selected Categories 420A-420F. In an embodiment, the space elasticity machine learning model utilizes equation (1) described above to calculate the space elasticity of Selected Categories 420A-420F products sold at Selected Stores (432A, 434A, 434B and 432B) as a function of space allocated to each product, item, and/or quantity at each Selected Store (432A, 434A, 434B and 432B). Having calculated the space elasticity of Selected Categories 420A-420F products sold at Selected Stores (432A, 434A, 434B and 432B) as a function of space allocated to each product, item, and/or quantity at each Selected Store (432A, 434A, 434B and 432B), space and location elasticity module 232 stores the calculated space elasticity in space elasticity data 258. Visualization engine generates 220 fourth GUI display 700, illustrated by FIG. 7, to display the calculated space elasticity.

Figure 7:
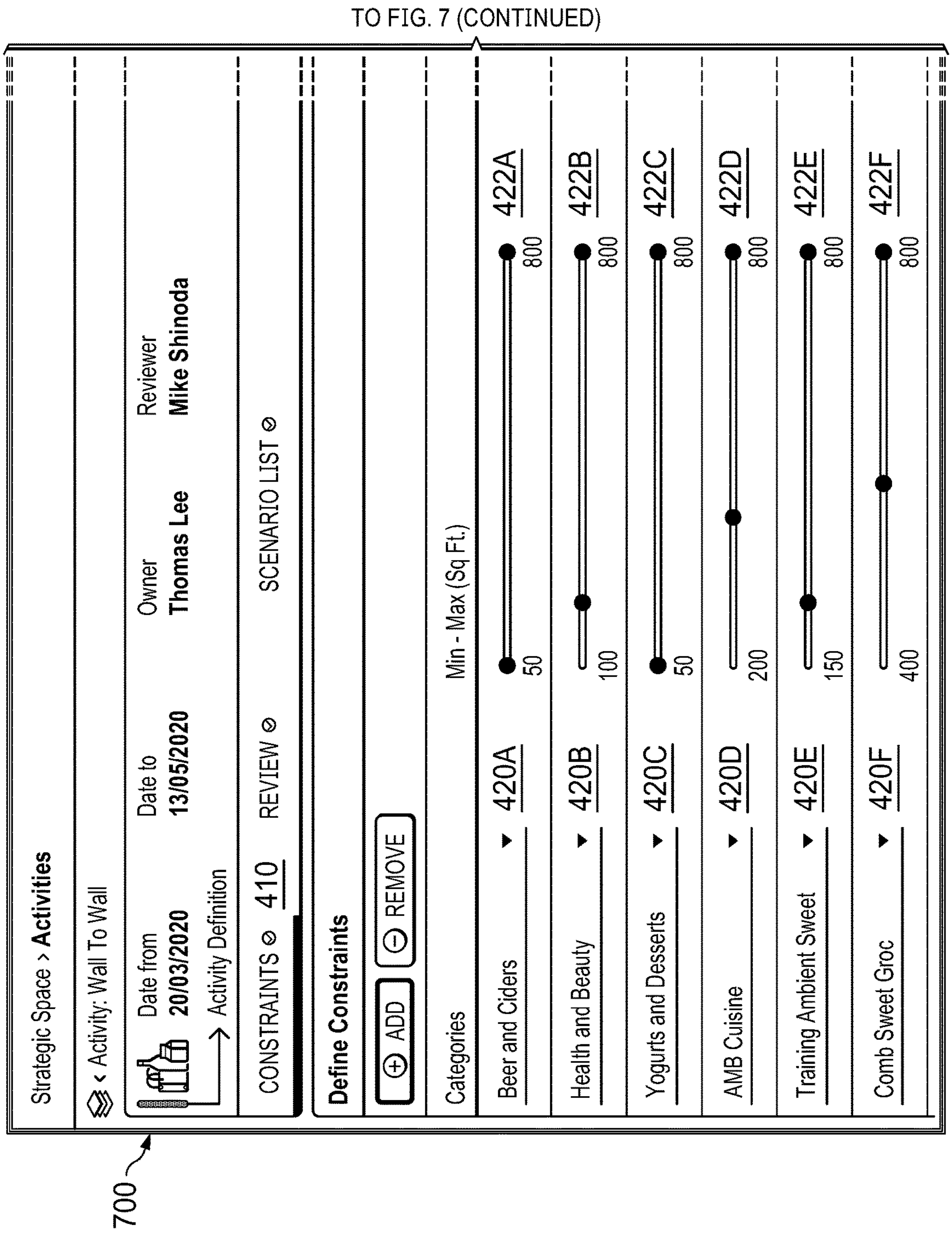
FIG. 7 illustrates a fourth graphical user interface display, according to an embodiment.
Figure 7:
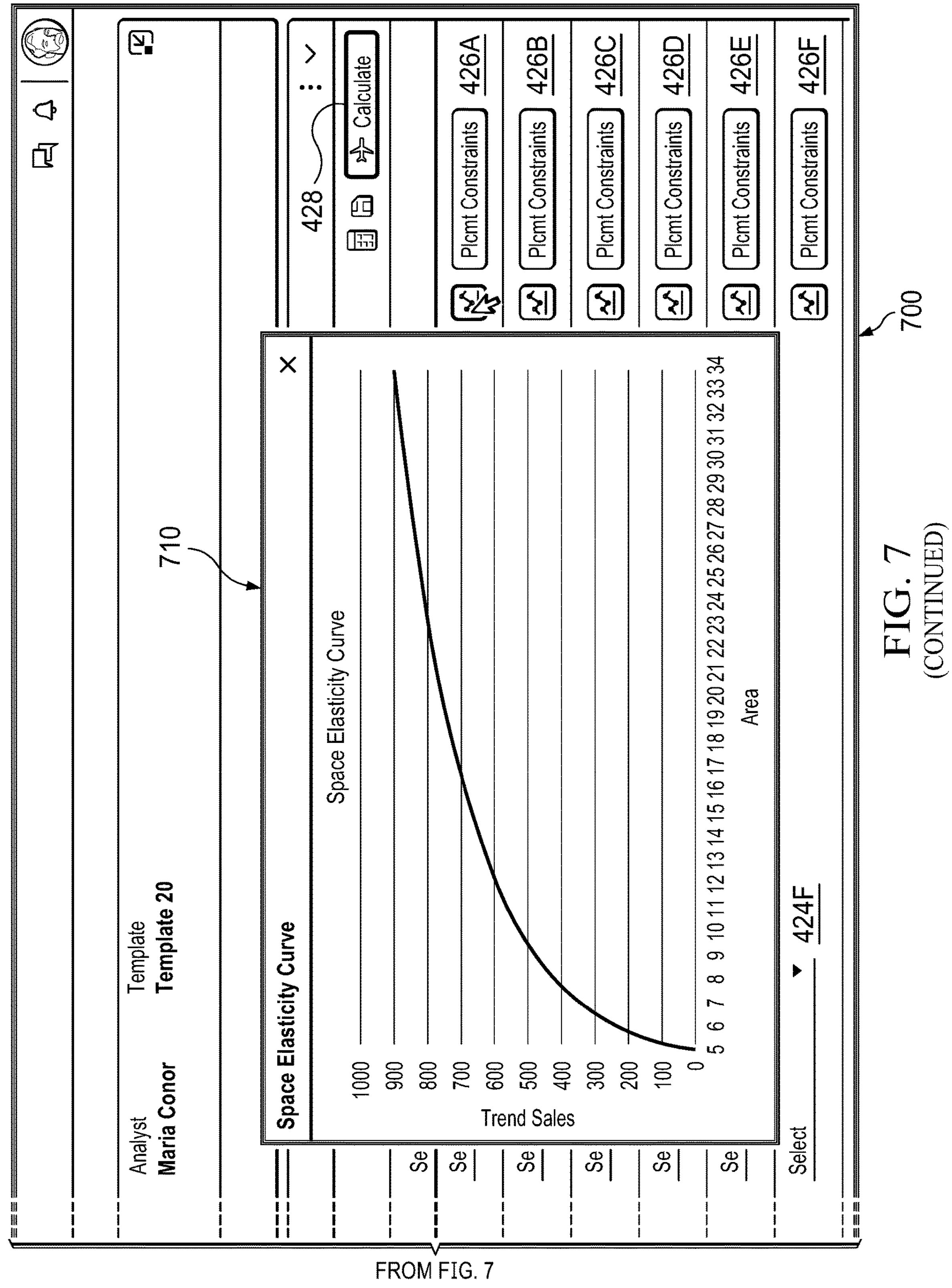

FIG. 7 illustrates fourth GUI display 700, according to an embodiment. Continuing the example, in the embodiment illustrated by FIG. 7, fourth GUI display 700 illustrates "Space Elasticity Curve" pop-up box 710, illustrating the calculated space elasticity of Selected Categories 420A-420F at Selected Stores (432A, 434A, 434B and 432B). Although FIG. 7 illustrates fourth GUI display 700 in a particular configuration, embodiments contemplate visualization engine 220 generating one or more GUI displays in any configuration and displaying any calculated space elasticity data or other database 114 data, according to particular needs.

In the embodiment illustrated by FIG. 7, "Space Elasticity Curve" pop-up box 710 displays the space elasticity of a particular Selected Categories product sold at the Selected Stores (432A, 434A, 434B and 432B) as a function of space allocated to the product, with sales increasing as the space devoted to the product increases. Although FIG. 7 illustrates "Space Elasticity Curve" pop-up box 710 in a particular configuration and displaying the space elasticity associated with a single product, embodiments contemplate "Space Elasticity Curve" pop-up boxes 710 displaying space elasticity for any products, combinations of products, departments, categories, and/or other space elasticity data associated with one or more supply chain entities 140, according to particular needs.

Continuing the example, at fourth action 340, space recommendation module 236 generates one or more Selected Categories space allocation recommendations for the Selected Stores (432A, 434A, 434B and 432B). Space recommendation module 236 accesses Selected Stores (432A, 434A, 434B and 432B), and Selected Categories 420A-420F stored in model input data 256, historical data 240 and all data 242-248 stored within historical data 240, and the calculated space elasticity stored in space elasticity data 258. Space recommendation module 236 calculates space allocations and generates space allocation recommendations (including but not limited to space allocation plans) that maximize the profitability of Selected Categories 420A-420F at each store of Selected Stores (432A, 434A, 434B and 432B). In this example, space recommendation module 236 calculates space allocations and generates space allocation recommendations for Selected Categories 420A-420F using equation (2) described above. Having generated space allocation recommendations (including, in this example, space allocation plans) for Selected Categories 420A-420F in Selected Stores (432A, 434A, 434B and 432B), space recommendation module 236 stores the space allocation recommendations and space allocation plans in space recommendation data 260. Visualization engine 220 generates fifth GUI display 800, illustrated by FIG. 8, to display the space allocation recommendations via store display 810.

Figure 8:
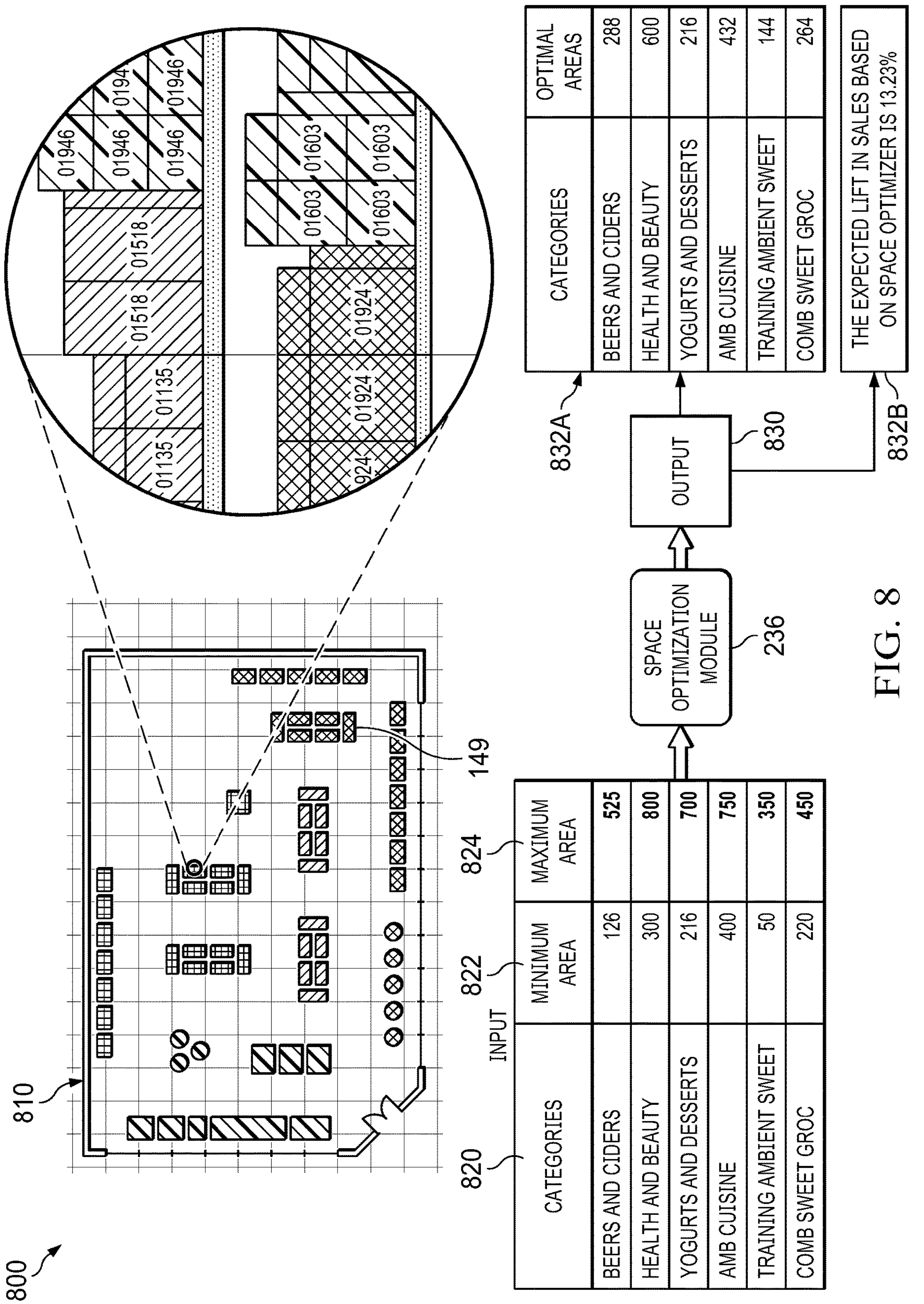
FIG. 8 illustrates a fifth graphical user interface display including the space optimization module of FIG. 2, according to an embodiment.

FIG. 8 illustrates fifth GUI display 800 including space optimization module 236, according to an embodiment. Fifth GUI display 800 displays store display 810, showing automated robotic shelving machinery 149 of retailer 148. Continuing the example, in the embodiment illustrated by FIG. 8, fifth GUI display 800 illustrates a "Space Optimization" input-output flow diagram, illustrating the inputs 820 to, and outputs 830 from, space recommendation module 236 as it recommends space allocations 832A for each of Selected Categories 420A-420F. Inputs 820 include minimum areas 822 and maximum areas 824 for each of Selected Categories 420A-420F. Outputs 830 include space recommendations 832A and sales expectations 832B. Although FIG. 8 illustrates fifth GUI display 800 in a particular configuration, embodiments contemplate visualization engine 220 generating one or more GUI displays in any configuration and displaying any space allocation recommendations, space allocation plans, or other database 114 data, according to particular needs.

In the embodiment illustrated by FIG. 8, space recommendation module 236 recommends space recommendations 832A for each of Selected Categories 420A-420F at each of the Selected Stores (432A, 434A, 434B and 432B): Beer and Ciders, 288; Health and Beauty, 600; Yogurts and Desserts, 216; AMB Cuisine, 432; Training Ambient Sweet, 144; and Comb Sweet Groc, 264. Space recommendation module 236 also calculates an expected rise in sales of Selected Categories products is 13.23% after implementing the space allocation recommendations, as compared to the previous configuration of Selected Categories 420A-420F, as displayed in sales expectations 832B. Although not illustrated in FIG. 8, other embodiments may generate GUI displays displaying space allocation recommendations, space allocation plans, and expected rises in sales in any configuration, according to particular needs.

Continuing the example, at fifth action 350, placement recommendation module 234 generates placement recommendations for the products of the Selected Categories 420A-420F in the Selected Stores (432A, 434A, 434B and 432B). In this example, the placement recommendation module 234 accesses the Selected Stores (432A, 434A, 434B and 432B) and Selected Categories 420A-420F stored in model input data 256, historical data 240 and all data 242-248 stored within historical data 240, the calculated space elasticity stored in space elasticity data 258, space allocation recommendations (including, in this example, space allocation plans) for Selected Categories 420A-420F in the Selected Stores (432A, 434A, 434B and 432B) stored in space recommendation data 260, and a genetic algorithm stored in algorithms and models data 264. Placement recommendation module 234 uses the genetic algorithm to generate placement recommendations, including but not limited to one or more product placement plans, specifying the placement of Selected Categories 420A-420F products within Selected Stores (432A, 434A, 434B and 432B) space recommended by the previously-generated space allocation recommendations. Placement recommendation module 234 stores the Selected Categories placement recommendations in placement recommendation data 262 of database 114. Visualization engine 220 generates sixth GUI display 900, illustrated by FIG. 9, to display the Selected Categories placement recommendations.

Figure 9:
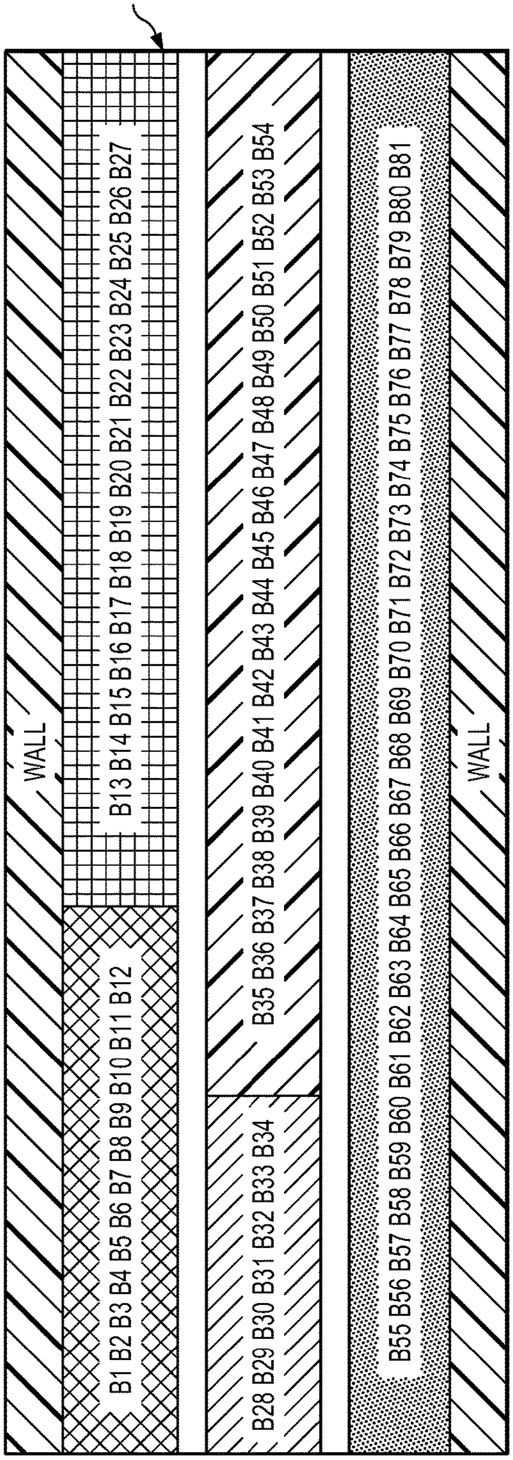
FIG. 9 illustrates a sixth graphical user interface display, according to an embodiment.

FIG. 9 illustrates sixth GUI display 900, according to an embodiment. Continuing the example, in the embodiment illustrated by FIG. 9, sixth GUI display 900 illustrates a "Placement Optimization" input-output flow diagram, illustrating the inputs 920 to, and outputs 930 from, the placement recommendation module 234 as it recommends placement allocations 950 for each of the six Selected Categories 940. Inputs 920 include fixtures 920A, showing the fixtures of the store, the size in square feet of the fixtures, and the number of bays of each fixture. Inputs 920 also include space recommendations 920B, which may be the output of placement optimization module 236. Inputs 920 also include constraints 920C, which detail the constraints on the placement of categories 420A-420F. Constraints 920C include category grouping, which specify, in this example, what department a category must be placed in, adjacencies, which in this example include negative adjacencies (categories that cannot be placed adjacent to one another) and positive adjacencies (categories that must be placed adjacent to one another), whether splitting a category across fixtures is allowed, and overlap, whether a category's placement should overlap with its placement in the existing planogram. In other examples, additional constraints 920C may be possible. Although FIG. 9 illustrates a sixth GUI display 900 in a particular configuration, embodiments contemplate the visualization engine 220 generating one or more GUI displays in any configuration and displaying any placement allocation recommendations, product placement plans, or other macro space recommendation engine database data, according to particular needs.

In the embodiment illustrated by FIG. 9, placement recommendation module 234 using the genetic algorithm recommends the following placement allocations 930 for each of Selected Categories 420A-420F at each of the Selected Stores (432A, 434A, 434B and 432B): Beer and Ciders, Aisle 1—bay 1 to bay 12; Health and Beauty, Aisles 2 and 3—bay 22 to bay 46; Yogurts and Desserts, Aisle 1—bay 13 to bay 21; AMB Cuisine, Aisle 3—bay 58 to bay 75; Training Ambient Sweet, Aisle 3—bay 76 to bay 81; and Comb Sweet Groc, Aisles 2 and 3—bay 47 to bay 57. Although not illustrated in FIG. 9, other embodiments may generate GUI displays displaying placement allocation recommendations, product placement plans, and/or any other outputs of the placement recommendation module in any configuration, according to particular needs.

Figure 10:
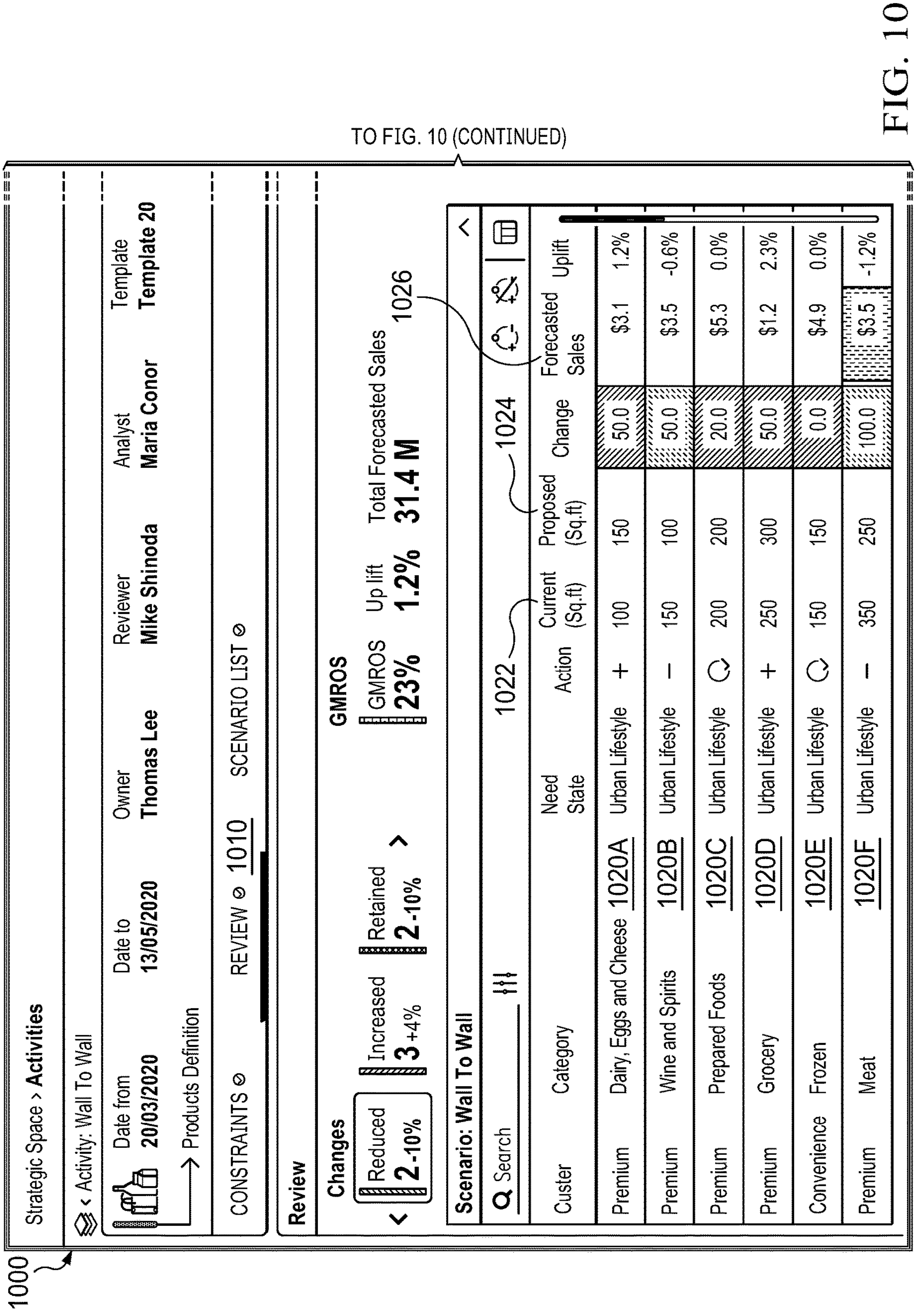
FIG. 10 illustrates an exemplary recommendation review display generated by the visualization engine, according to an embodiment.
Figure 10:
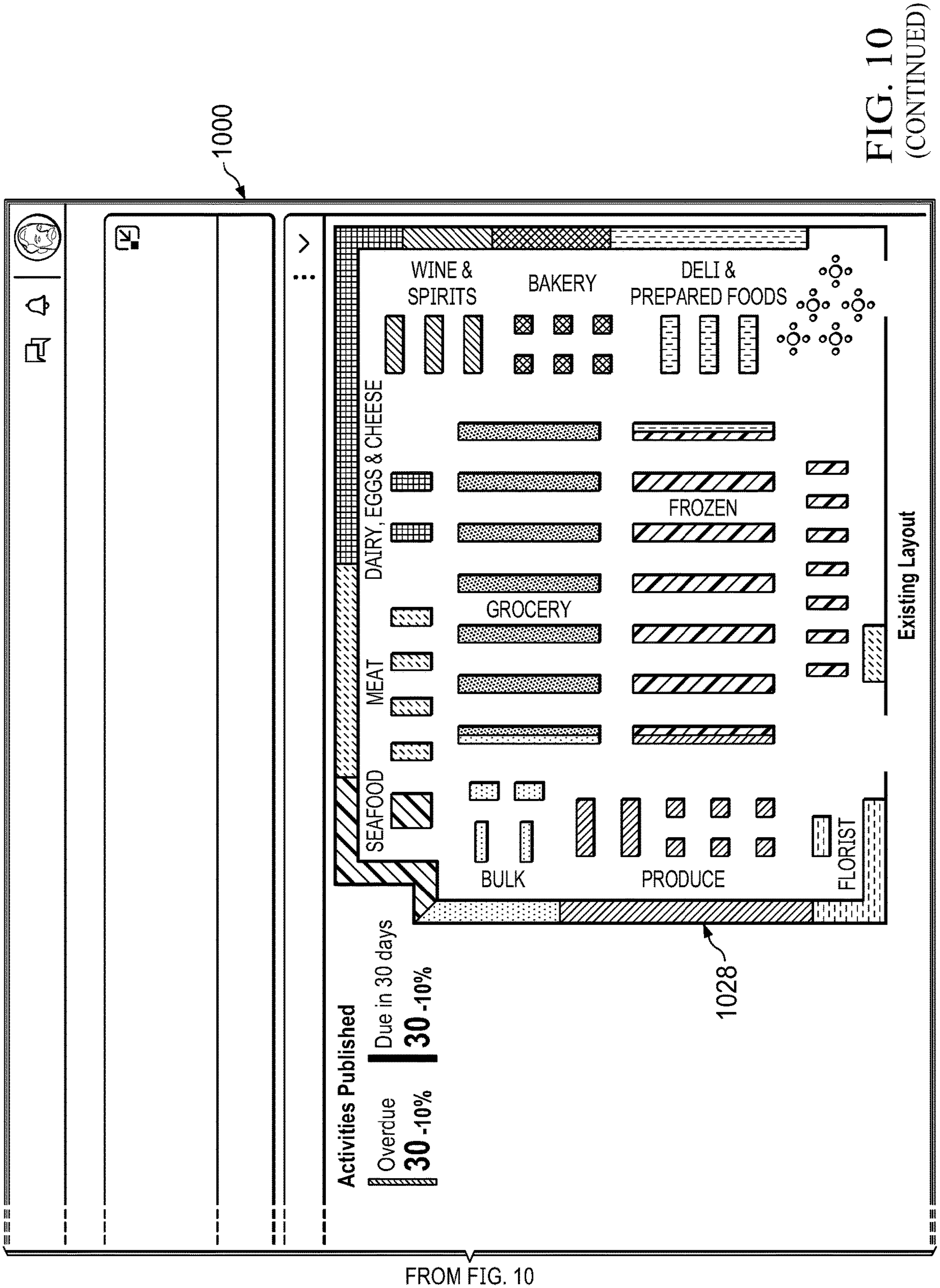

Continuing the example, at sixth action 360, visualization engine 220 generates and displays recommendation output display 1000, illustrated by FIG. 10, to visualize Selected Categories 420A-420B and Selected Stores (432A, 434A, 434B and 432B) space allocation recommendations and placement recommendations. In this example, visualization engine 220 accesses the space allocation recommendations stored in space recommendation data 260, and the placement recommendations stored in placement recommendation data 262. Visualization engine 220 generates and displays recommendation output display 1000 to visualize the space allocation recommendations and/or placement recommendations using one or more display devices.

FIG. 10 illustrates exemplary recommendation review display 1000 generated by visualization engine 220, according to an embodiment. In the embodiment illustrated by FIG. 10, recommendation review display 1000 displays "Review" tab 1010, illustrating current square feet 1022, proposed square feet 1024, forecasted sales 1026, existing layout arrangement 1028, and other data related to products across six categories 1020A-1020F, generated by macro space recommendation engine 110 according to the actions of above-described method 300. Although FIG. 10 illustrates recommendation review display 1000 in a particular configuration, embodiments contemplate visualization engine 220 generating one or more recommendation review displays 1000 in any configuration and displaying any macro space recommendation engine database data 114, according to particular needs.

In the embodiment illustrated by FIG. 10, recommended review display 1000 displays current square feet 1022 and proposed square feet 1024 columns of "Review" tab 1010 to indicate the changes that will be required at a macro space level to convert one or more supply chain entities 140, as well as the departments, categories, aisles, planograms, and/or products offered for sale at one or more supply chain entities 140, over to one or more recommended space allocation plans and/or product placement plans. In other embodiments, the recommended review display 1000 may display any macro space recommendation engine data, according to particular needs.

Figure 11:
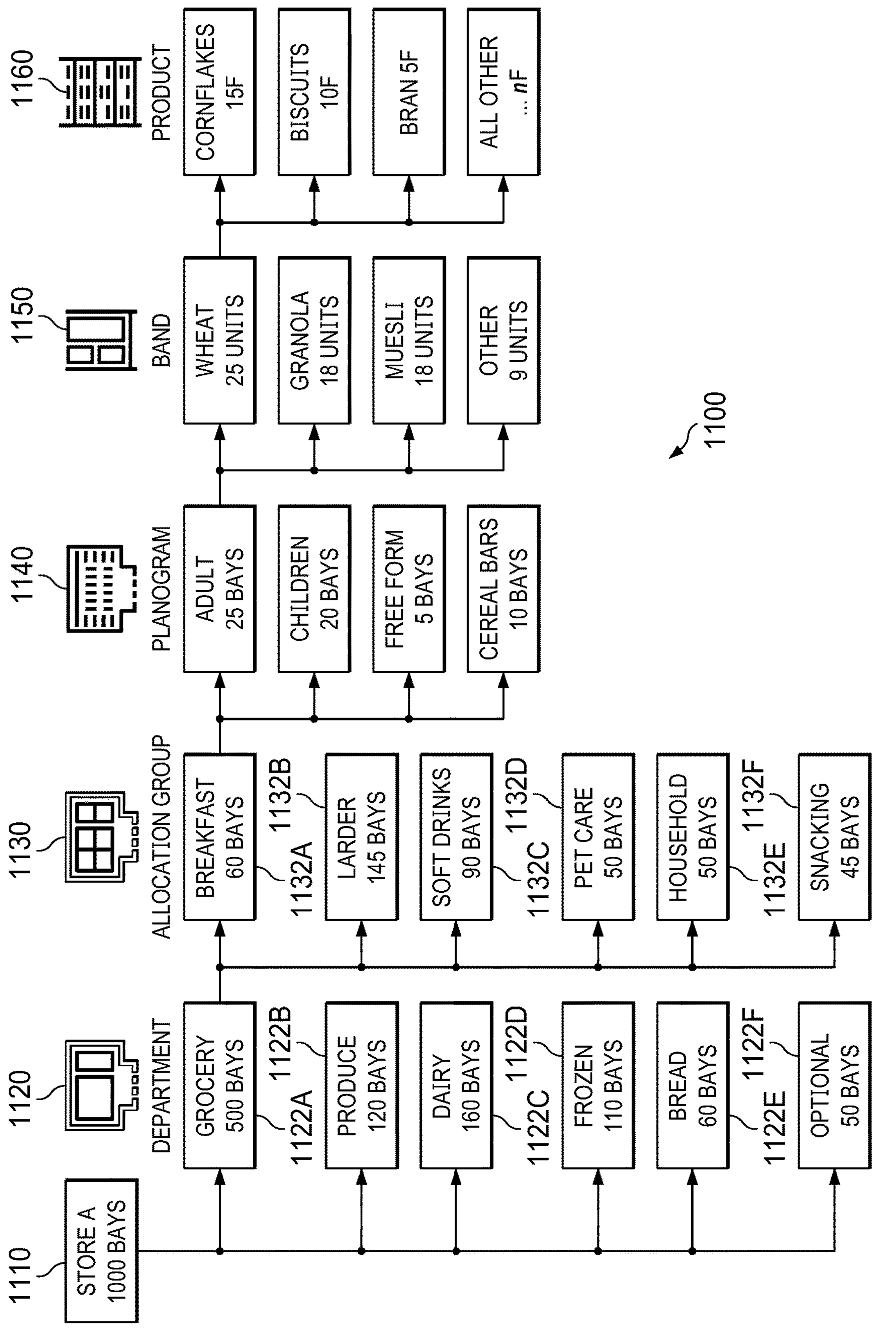
FIG. 11 illustrates an exemplary space break level display, according to an embodiment.

FIG. 11 illustrates exemplary space break level display 1100, according to an embodiment. In an embodiment, visualization engine 220 may access data stored in the space break data 252 and/or macro space recommendation engine database 114, and may generate space break level display 1100 to visualize the arrangement of one or more space break levels 1120-1160 (as illustrated in FIG. 11, "Department" 1120, "Allocation Group" 1130, "Planogram" 1140, "Band" 1150, and "Product" 1160) at one or more supply chain entities 140 (as illustrated in FIG. 11, "Store A" 1110). Although FIG. 11 illustrates space break level display 1100 in a particular configuration, embodiments contemplate visualization engine 220 generating space break level displays in any configuration and displaying any data stored in the macro space recommendation engine database 114, according to particular needs.

As illustrated in FIG. 11, each space break level 1120-1160 may comprise one or more selectable icons representing the lower-level space break categories that make up each space break level. For example, "Department" space break level 1120 comprises, as illustrated in FIG. 11, "Grocery" 1122A, "Produce" 1122B, "Dairy" 1122C, "Frozen" 1122D, "Bread" 1122E, and "Optional" 1122F categories. In an embodiment, user action processor 210 may respond to input to one or more input devices 152, and may select one or more space break level categories 1120-1160 (for example, selecting the "Grocery" 1122A department from within the "Department" 1120 space break level). In response, visualization engine 220 may display all lower-level categories that comprise the selected space break level (for example, by selecting the "Grocery" 1122A department, displaying the "Breakfast" 1132A, "Larder" 1132B, "Soft Drinks" 1132C, "Pet Care" 1132D, "Household" 1132E, and "Snacking" 1132F, allocation groups within the "Grocery" 1122A department). Macro space recommendation engine 110 may generate GUI displays of any detail and displaying the allocation of any products 1160, product categories, bands 1150, aisles, planograms 1140, allocation groups 1130, departments 1120, and/or other space break levels in response to the selection of one or more higher-level space break levels, according to particular needs.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

The invention claimed is:

1. A system for analyzing a retail space allocation, comprising:

a retail entity comprising a product display area, the product display area comprising one or more products and one or more product facings arranged in a first display configuration; and a macro space recommendation engine comprising a computer and database and configured to:

receive, by the computer, product data from automated machinery having at least one sensor, wherein the product data corresponds to the one or more products detected by the at least one sensor of the automated machinery;

analyze a space elasticity based, at least in part, on a machine learning model, wherein the machine learning model comprises one or more logarithmic functions;

generate a space allocation recommendation based, at least in part, on a summation of ratios of a product category evaluation metric to a historical value for each product category, wherein the space allocation recommendation is subject to at least one constraint;

generate a placement recommendation based, at least in part, on the generated space allocation recommendation; and rearrange, by automated robotic shelving machinery, the one or more products and the one or more product facings into a second display configuration, based, at least in part, on the generated space allocation recommendation and the generated placement recommendation.

2. The system of claim 1, further comprising the macro space recommendation engine configured to:

generate one or more review displays visualizing the first display configuration and the second display configuration; and display the one or more review displays on a display device.

3. The system of claim 1, further comprising the macro space recommendation engine generating the placement recommendation using a genetic algorithm.

4. The system of claim 1, further comprising calculating an expected rise in sales upon implementation of the space allocation recommendations.

5. The system of claim 1, wherein the macro space recommendation engine generates the space allocation recommendation and the placement recommendation to maximize profit.

6. The system of claim 1, wherein the product display area is segmented according to product categories.

7. The system of claim 1, wherein the macro space recommendation engine calculates the space elasticity as a function of space allocated in the product display area.

8. A computer-implemented method for analyzing a retail space allocation, comprising:

receiving, by a computer, product data from automated machinery having at least one sensor, wherein the product data corresponds to one or more products detected by the at least one sensor of the automated machinery;

analyzing, by the computer, a space elasticity for a retail entity comprising a product display area, the product display area comprising the one or more products and one or more product facings arranged in a first display configuration, wherein the analyzing is based, at least in part, on a machine learning model, and wherein the machine learning model comprises one or more logarithmic functions;

generating, by the computer, a space allocation recommendation based, at least in part, on a summation of ratios of a product category evaluation metric to a historical value for each product category, wherein the space allocation recommendation is subject to at least one constraint;

generating, by the computer, a placement recommendation based, at least in part, on the generated space allocation recommendation; and rearranging, by automated robotic shelving machinery, the one or more products and the one or more product facings into a second display configuration, based, at least in part, on the generated space allocation recommendation and the generated placement recommendation.

9. The computer-implemented method of claim 1, further comprising:

generating, by the computer, one or more review displays visualizing the first display configuration and the second display configuration; and displaying, by the computer, the one or more review displays on a display device.

10. The computer-implemented method of claim 1, further comprising:

generating, by the computer, the placement recommendation using a genetic algorithm.

11. The computer-implemented method of claim 1, further comprising:

calculating, by the computer, an expected rise in sales upon implementation of the space allocation recommendation.

12. The computer-implemented method of claim 1, further comprising:

generating, by the computer, the space allocation recommendation and the placement recommendation to maximize profit.

13. The computer-implemented method of claim 1, wherein the product display area is segmented according to product categories.

14. The computer-implemented method of claim 1, further comprising:

calculating, by the computer, the space elasticity as a function of space allocated in the product display area.

15. A non-transitory computer-readable medium embodied with software for analyzing a retail space allocation, the software when executed is configured to:

receive product data from automated machinery having at least one sensor, wherein the product data corresponds to one or more products detected by the sensor of the automated machinery;

analyze a space elasticity for a retail entity comprising a product display area, the product display area comprising the one or more products and one or more product facings arranged in a first display configuration, wherein the analyzing is based, at least in part, on a machine learning model, and wherein the machine learning model comprises one or more logarithmic functions;

generate a space allocation recommendation based, at least in part, on a summation of ratios of a product category evaluation metric to a historical value for each product category, wherein the space allocation recommendation is subject to at least one constraint;

generate a placement recommendation based, at least in part, on the generated space allocation recommendation; and rearrange, by automated robotic shelving machinery, the one or more products and the one or more product facings into a second display configuration, based, at least in part, on the generated space allocation recommendation and the generated placement recommendation.

16. The non-transitory computer-readable medium of claim 15, wherein the software when executed is further configured to:

generate one or more review displays visualizing the first display configuration and the second display configuration; and display the one or more review displays on a display device.

17. The non-transitory computer-readable medium of claim 15, wherein the software when executed is further configured to:

generate the placement recommendation using a genetic algorithm.

18. The non-transitory computer-readable medium of claim 15, wherein the software when executed is further configured to:

calculate an expected rise in sales upon implementation of the space allocation recommendation.

19. The non-transitory computer-readable medium of claim 15, wherein the software when executed is further configured to:

generate the space allocation recommendation and the placement recommendation to maximize profit.

20. The non-transitory computer-readable medium of claim 15, wherein the software when executed is further configured to:

segment the product display area according to product categories.

* * * * *